(12) United States Patent
Usoro et al.

(10) Patent No.: US 6,736,751 B1
(45) Date of Patent: May 18, 2004

(54) FAMILY OF MULTI-SPEED DUAL-CLUTCH TRANSMISSIONS HAVING THREE INTERCONNECTED PLANETARY GEAR MEMBERS

(75) Inventors: Patrick Benedict Usoro, Troy, MI (US); Chunhao J. Lee, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/313,512

(22) Filed: Dec. 6, 2002

(51) Int. Cl.$^7$ ................................................. F16H 3/62
(52) U.S. Cl. ........................ 475/276; 475/280; 475/296
(58) Field of Search ............................... 475/276, 280, 475/282, 284, 286, 296, 314, 320, 326, 330

(56) References Cited

U.S. PATENT DOCUMENTS

| | | | |
|---|---|---|---|
| 4,070,927 A | 1/1978 | Polak | 74/765 |
| 4,143,562 A * | 3/1979 | Murakami et al. | 475/276 |
| 4,531,428 A * | 7/1985 | Windish | 475/279 |
| 4,683,776 A * | 8/1987 | Klemen | 475/286 |
| 4,709,594 A | 12/1987 | Maeda | 74/753 |
| 5,106,352 A | 4/1992 | Lepelletier | 475/280 |
| 5,385,064 A | 1/1995 | Reece | 74/331 |
| 5,497,867 A | 3/1996 | Hirsch et al. | 192/48.91 |
| 5,560,461 A | 10/1996 | Loeffler | 192/53.32 |
| 5,599,251 A | 2/1997 | Beim et al. | 475/275 |
| 5,641,045 A | 6/1997 | Ogawa et al. | 192/53.341 |
| 5,651,435 A | 7/1997 | Perosky et al. | 192/24 |
| 5,975,263 A | 11/1999 | Forsyth | 192/53.32 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,217,474 B1 | 4/2001 | Ross et al. | 475/269 |
| 6,342,026 B1 * | 1/2002 | Takagi et al. | 475/276 |
| 6,354,416 B1 | 3/2002 | Eo | 192/53.341 |

FOREIGN PATENT DOCUMENTS

| | | | | |
|---|---|---|---|---|
| JP | 402248757 | * | 10/1990 | 475/159 |
| JP | 9-126283 | | 5/1997 | |

* cited by examiner

*Primary Examiner*—Ha Ho
(74) *Attorney, Agent, or Firm*—Kathryn A Marra

(57) ABSTRACT

The family of transmissions has a plurality of members that can be utilized in powertrains to provide at least six forward speed ratios and one reverse speed ratio. The transmission family members include four planetary gear sets, two input clutches, eight torque transmitting mechanisms, and two fixed interconnections. The invention provides a low content multi-speed dual clutch transmission mechanism wherein the two input clutches alternately connect the engine to realize odd and even number speed ratio ranges. The eight torque transmitting mechanisms provide connections between various gear members, the fixed interconnections, the input clutches, the output shaft, and the transmission housing, and are operated in combinations of three to establish at least six forward speed ratios and at least one reverse speed ratio. One of the torque transmitting mechanisms may be eliminated to provide at least five forward speed ratios and at least one reverse speed ratio.

30 Claims, 14 Drawing Sheets

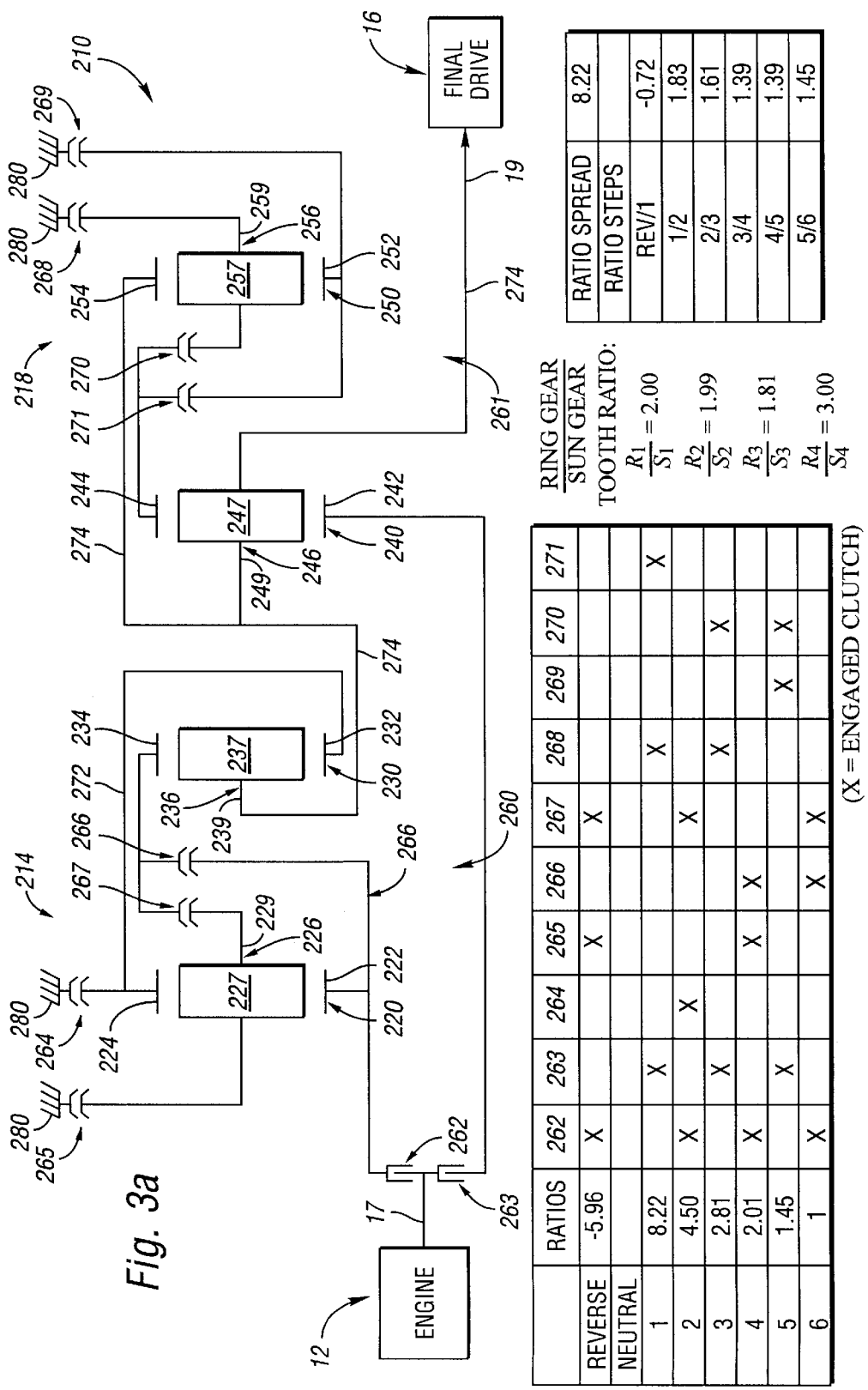

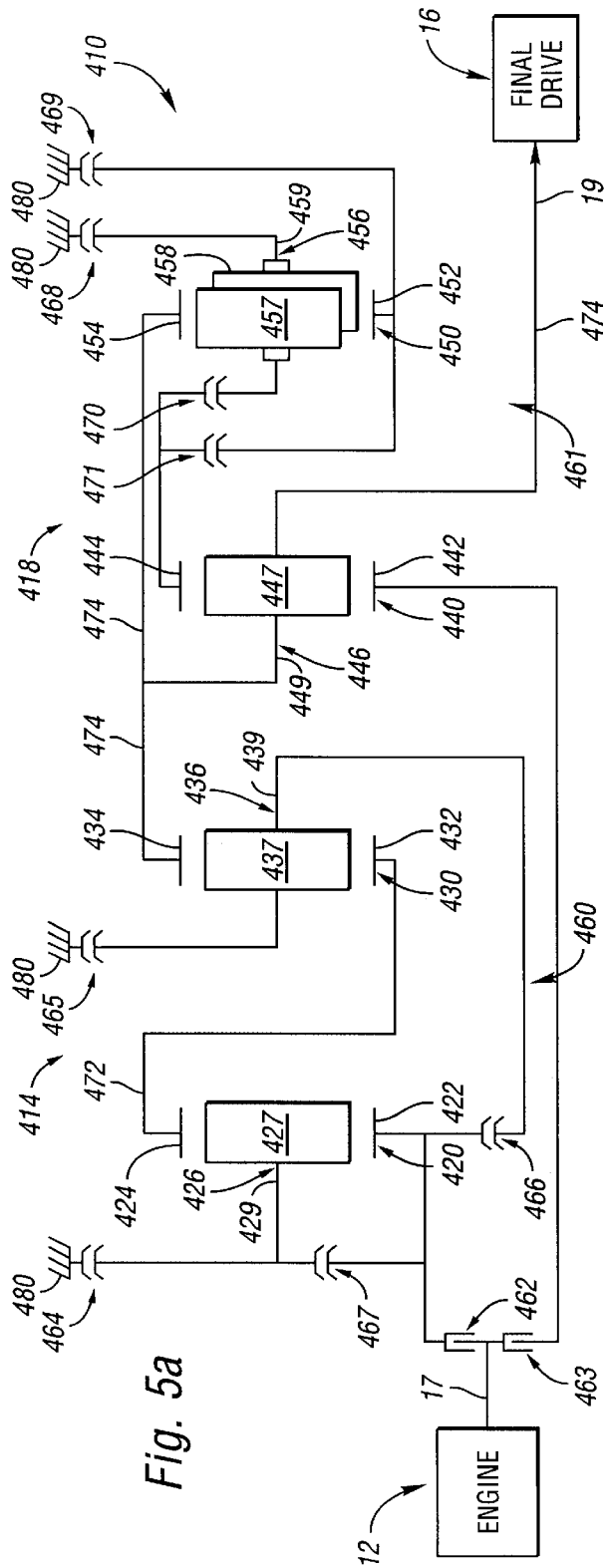
Fig. 5a / Fig. 5b

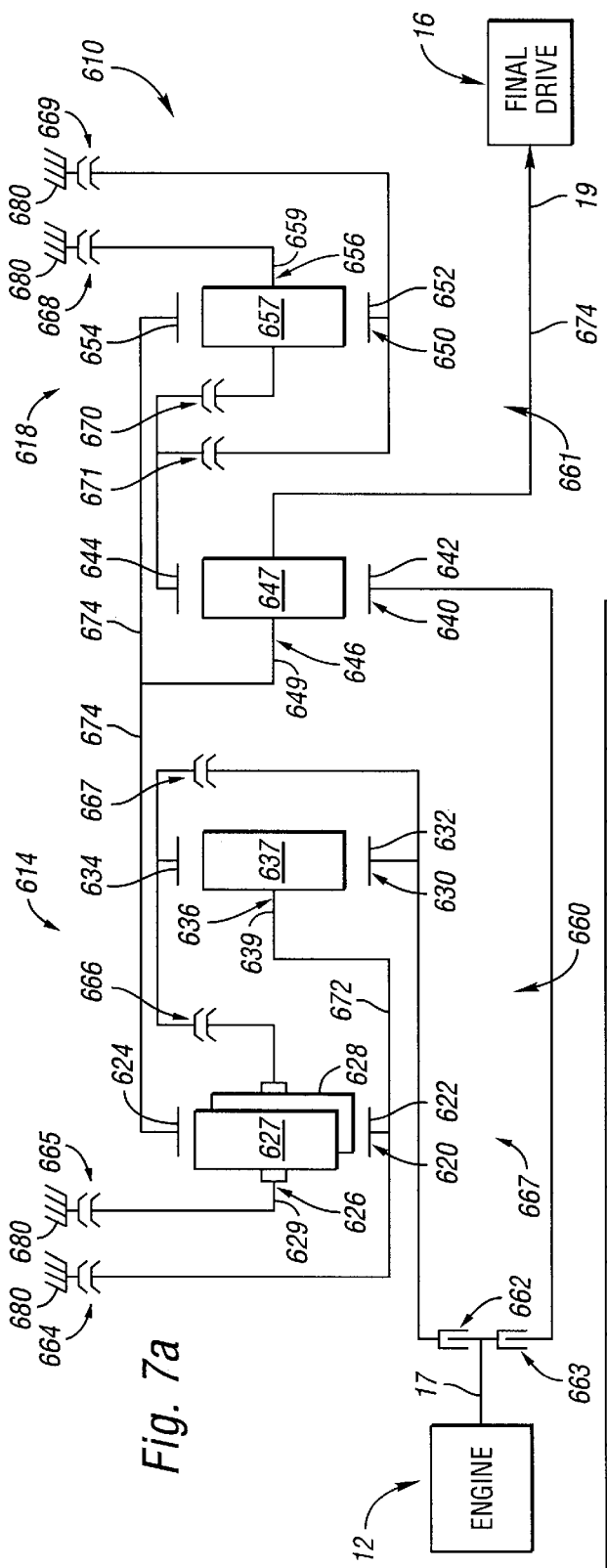

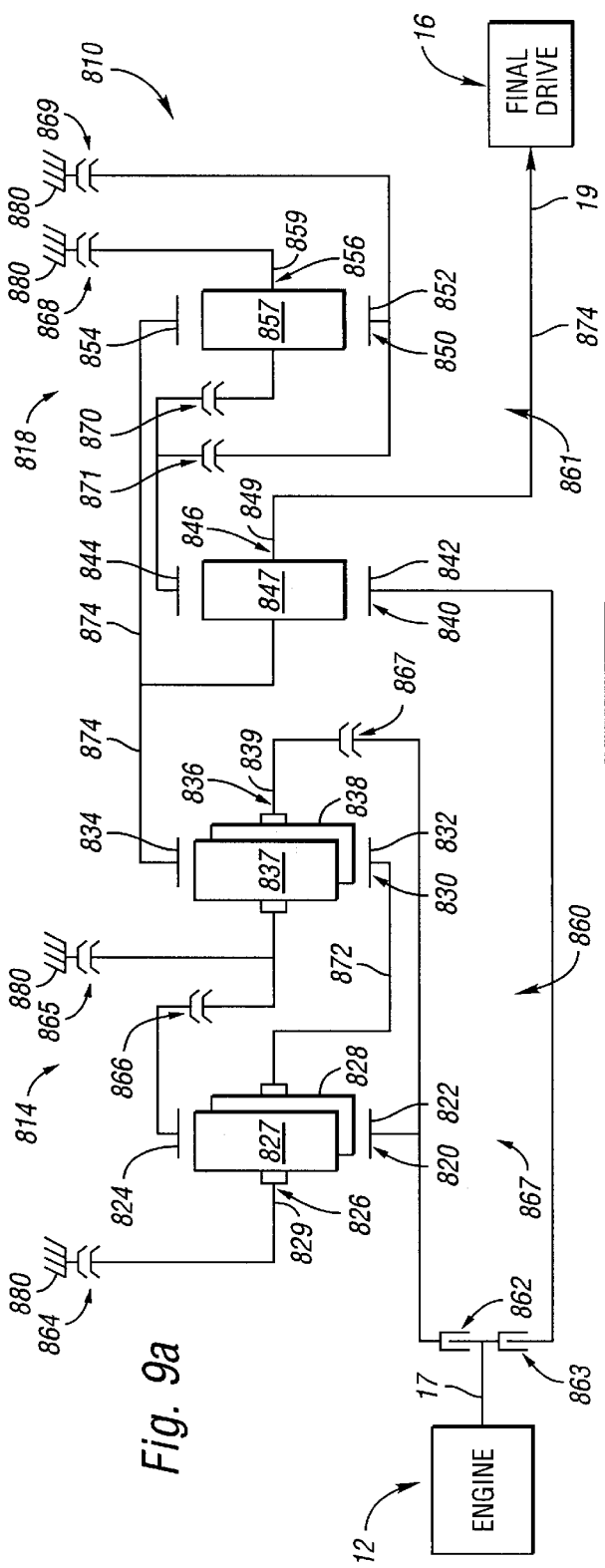

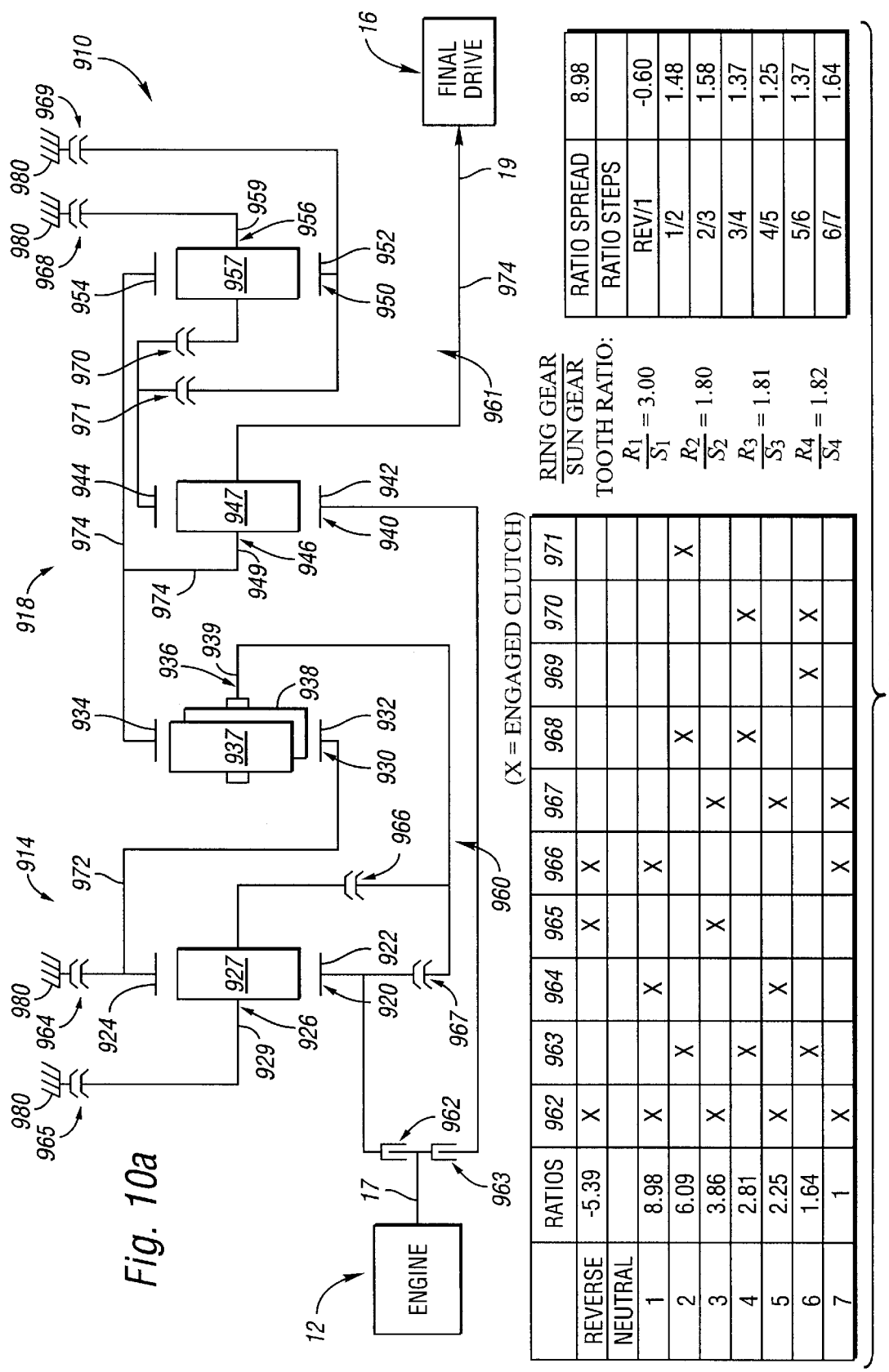

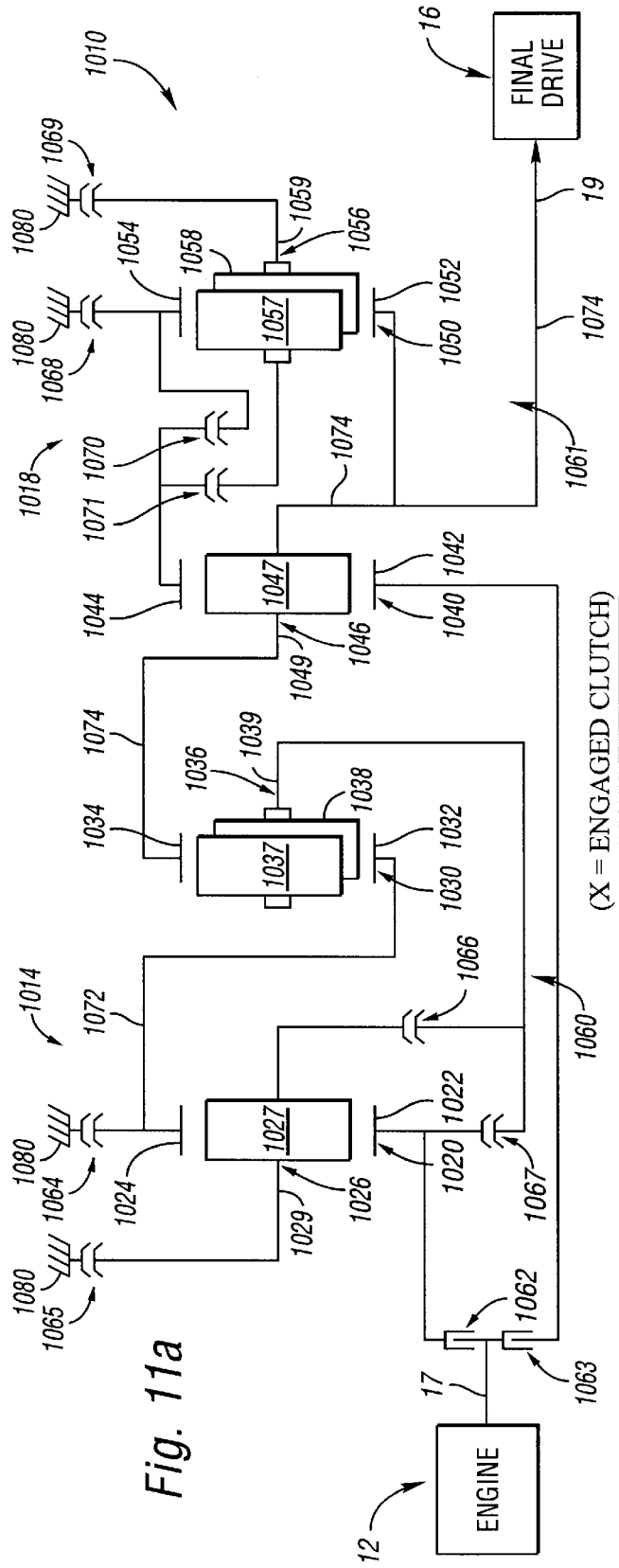
Fig. 11a / Fig. 11b

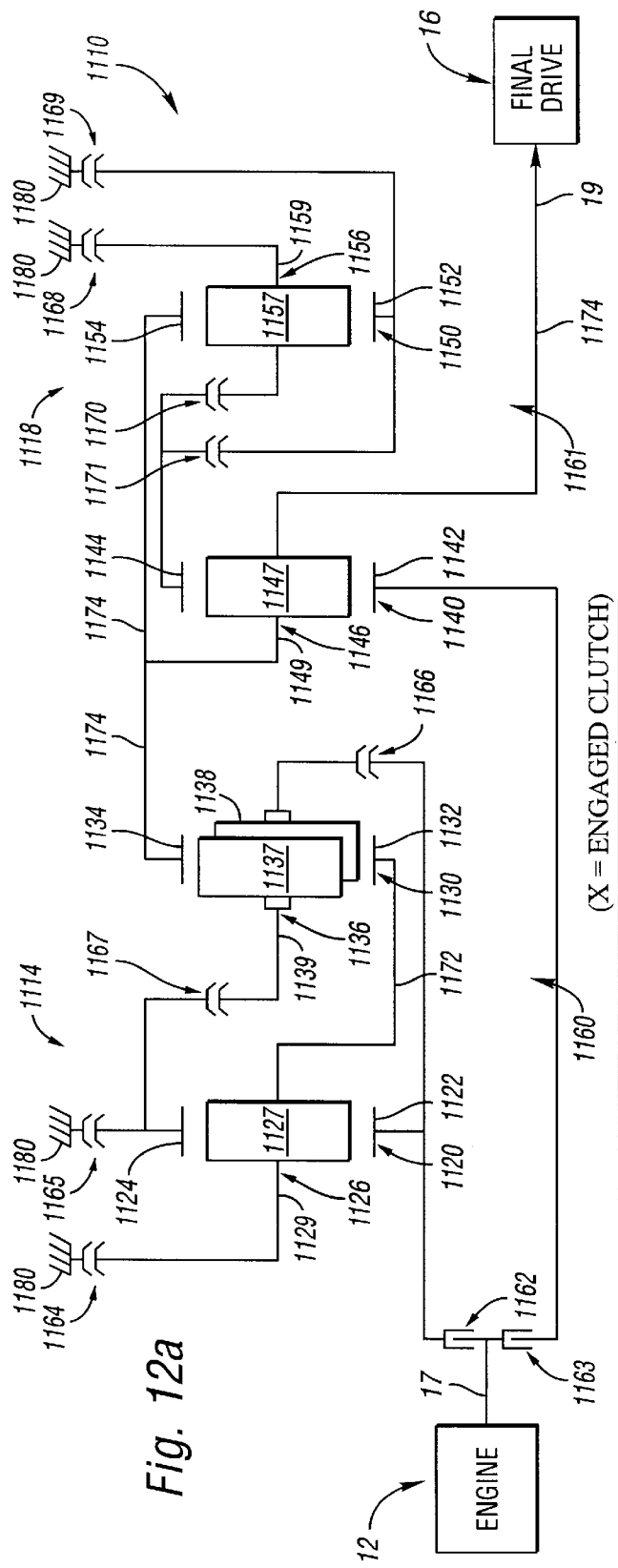

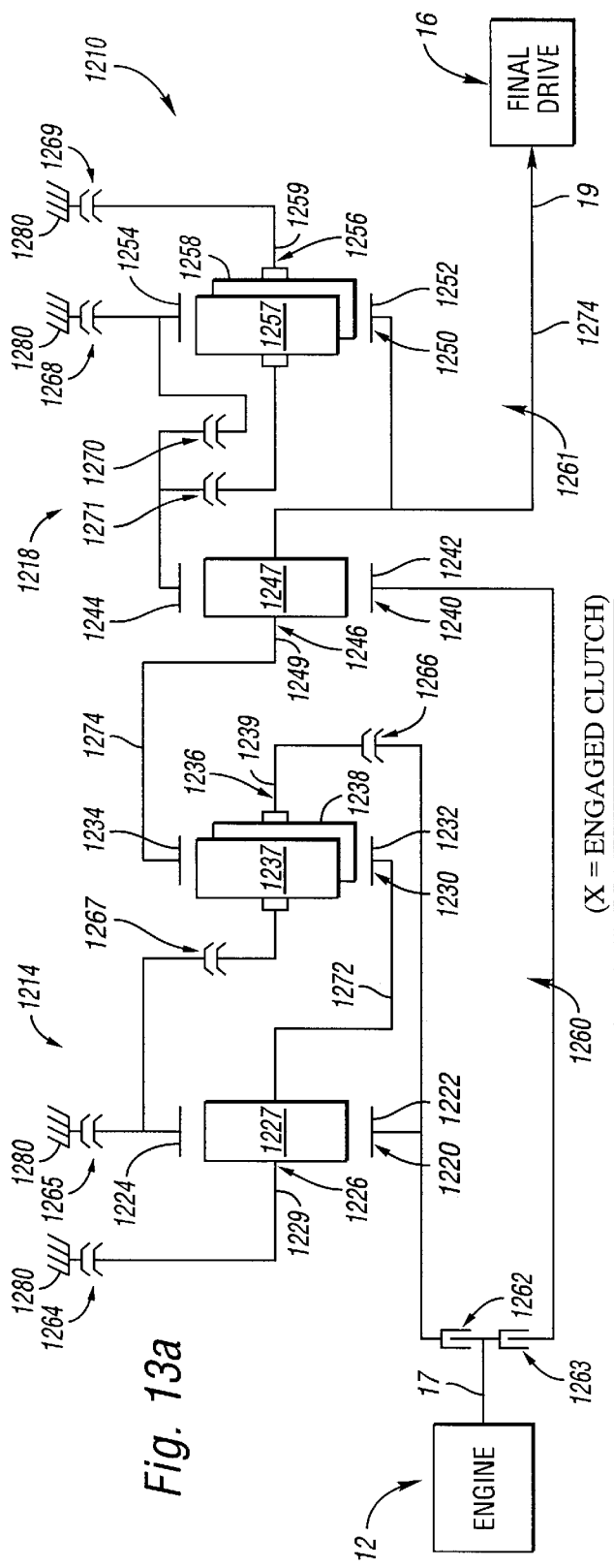

FAMILY OF MULTI-SPEED DUAL-CLUTCH TRANSMISSIONS HAVING THREE INTERCONNECTED PLANETARY GEAR MEMBERS

TECHNICAL FIELD

The present invention relates to a family of power transmissions having two input clutches which selectively connect an input shaft to first and second pairs of planetary gear sets to provide at least five forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times.

A primary focus of transmission and engine design work is in the area of increasing vehicle fuel efficiency. Manual transmissions typically provide improved vehicle fuel economy over automatic transmissions because automatic transmissions use a torque converter for vehicle launch and multiple plate hydraulically-applied clutches for gear engagement. Clutches of this type, left unengaged or idling, impose a parasitic drag torque on a drive line due to the viscous shearing action which exists between the plates and discs rotating at different speeds relative to one another. This drag torque adversely affects vehicle fuel economy for automatic transmissions. Also, the hydraulic pump that generates the pressure needed for operating the above-described clutches further reduces fuel efficiency associated with automatic transmissions. Manual transmissions eliminate these problems.

While manual transmissions are not subject to the above described fuel efficiency related problems, manual transmissions typically provide poor shift quality because a significant torque interruption is required during each gear shift as the engine is disengaged from the transmission by the clutch to allow shafts rotating at different speeds to be synchronized.

So called "automated manual" transmissions provide electronic shifting in a manual transmission configuration which, in certain circumstances, improves fuel efficiency by eliminating the parasitic losses associated with the torque converter and hydraulic pump needed for clutching. Like manual transmissions, a drawback of automated manual transmissions is that the shift quality is not as high as an automatic transmission because of the torque interruption during shifting.

So called "dual-clutch automatic" transmissions also eliminate the torque converter and replace hydraulic clutches with synchronizers but they go further to provide gear shift quality which is superior to the automated manual transmission and similar to the conventional automatic transmission, which makes them quite attractive. However, most known dual-clutch automatic transmissions include a lay shaft or countershaft gear arrangement, and have not been widely applied in vehicles because of their complexity, size and cost. For example, a dual clutch lay shaft transmission could require eight sets of gears, two input/shift clutches and seven synchronizers/dog clutches to provide six forward speed ratios and a reverse speed ratio. An example of a dual-clutch automatic transmission is described in U.S. Pat. No. 5,385,064, which is hereby incorporated by reference.

SUMMARY OF THE INVENTION

The invention provides a low content multi-speed dual-clutch transmission family utilizing planetary gear sets rather than lay shaft gear arrangements. In particular, the invention includes four planetary gear sets, two input/shift clutches, and eight selectable torque transmitting mechanisms to provide at least six forward speed ratios and a reverse speed ratio.

According to one aspect of the invention, the family of transmissions has four planetary gear sets, each of which includes a first, second and third member, which members may comprise a sun gear, ring gear, or a planet carrier assembly member.

In referring to the first, second, third and fourth gear sets in this description and in the claims, these sets may be counted "first" to "fourth" in any order in the drawings (i.e. left-to-right, right-to-left, etc.).

In another aspect of the present invention, each of the planetary gear sets may be of the single pinion type or of the double pinion type.

In yet another aspect of the present invention, the first member of the first planetary gear set is continuously connected with the first member of the second planetary gear set through a first interconnecting member.

In yet another aspect of the present invention, another member of the first or second planetary gear set is continuously connected with the first member of the third planetary gear set, the first member of the fourth planetary gear set and with the output shaft through a second interconnecting member.

In accordance with a further aspect of the invention, a first input clutch selectively connects the input shaft with a member of the first or second planetary gear set.

In accordance with another aspect of the present invention, a second input clutch selectively connects the input shaft with the second member of the third planetary gear set.

In another aspect of the invention, first and second torque transmitting mechanisms, such as synchronizers, selectively connect members of the first and second planetary gear sets with other members of the first and second planetary gear sets, or with the first input clutch.

In still a further aspect of the invention, third and fourth torque transmitting mechanisms, such as synchronizers, selectively connect members of the third planetary gear set with members of the fourth planetary gear set.

In still another aspect of the invention, fifth and sixth torque transmitting mechanisms, such as brakes, selectively connect members of the first or second planetary gear set with a stationary member (transmission housing).

In still another aspect of the invention, seventh and eighth torque transmitting mechanisms, such as brakes, selectively connect members of the fourth planetary gear set with the stationary member.

In accordance with a further aspect of the invention, the input clutches and torque transmitting mechanisms are selectively engaged in combinations of at least three to provide at least six forward speed ratios and a reverse speed ratio.

In accordance with a further aspect of the invention, the eight torque transmitting mechanisms may comprise synchronizers.

In accordance with a further aspect of the invention, the first input clutch is applied for odd number speed ranges, and the second input clutch is applied for even number speed ranges, or vice versa.

In another aspect of the invention, the first input clutch and the second input clutch are interchanged (i.e. alternately engaged) to shift from odd number speed range to even number speed range, or vice versa.

In accordance with a further aspect of the invention, each selected torque transmitting mechanism for a new speed ratio is engaged prior to shifting of the input clutches to achieve shifts without torque interruptions.

In accordance with a further aspect of the invention, at least one pair of synchronizers is executed as a double synchronizer to reduce cost and package size.

In accordance with a further aspect of the invention, at least one of the torque transmitting mechanisms can be eliminated to realize five forward speed ratios and a reverse speed ratio.

The above objects, features, advantages, and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission incorporating a family member of the present invention;

FIG. 1b is a truth table and chart depicting some of the operating characteristics of the powertrain shown in FIG. 1a;

FIG. 2a is a schematic representation of a powertrain having a planetary transmission incorporating another family member of the present invention;

FIG. 2b is a truth table and chart depicting some of the operating characteristics of the powertrain shown in FIG. 2a;

FIG. 3a is a schematic representation of a powertrain having a planetary transmission incorporating another family member of the present invention;

FIG. 3b is a truth table and chart depicting some of the operating characteristics of the powertrain shown in FIG. 3a;

FIG. 4a is a schematic representation of a powertrain having a planetary transmission incorporating another family member of the present invention;

FIG. 4b is a truth table and chart depicting some of the operating characteristics of the powertrain shown in FIG. 4a;

FIG. 5a is a schematic representation of a powertrain having a planetary transmission incorporating another family member of the present invention;

FIG. 5b is a truth table and chart depicting some of the operating characteristics of the powertrain shown in FIG. 5a;

FIG. 6a is a schematic representation of a powertrain having a planetary transmission incorporating another family member of the present invention;

FIG. 6b is a truth table and chart depicting some of the operating characteristics of the powertrain shown in FIG. 6a;

FIG. 7a is a schematic representation of a powertrain having a planetary transmission incorporating another family member of the present invention;

FIG. 7b is a truth table and chart depicting some of the operating characteristics of the powertrain shown in FIG. 7a;

FIG. 8a is a schematic representation of a powertrain having a planetary transmission incorporating another family member of the present invention;

FIG. 8b is a truth table and chart depicting some of the operating characteristics of the powertrain shown in FIG. 8a;

FIG. 9a is a schematic representation of a powertrain having a planetary transmission incorporating another family member of the present invention;

FIG. 9b is a truth table and chart depicting some of the operating characteristics of the powertrain shown in FIG. 9a;

FIG. 10a is a schematic representation of a powertrain having a planetary transmission incorporating another family member of the present invention;

FIG. 10b is a truth table and chart depicting some of the operating characteristics of the powertrain shown in FIG. 10a;

FIG. 11a is a schematic representation of a powertrain having a planetary transmission incorporating another family member of the present invention;

FIG. 11b is a truth table and chart depicting some of the operating characteristics of the powertrain shown in FIG. 11a;

FIG. 12a is a schematic representation of a powertrain having a planetary transmission incorporating another family member of the present invention;

FIG. 12b is a truth table and chart depicting some of the operating characteristics of the powertrain shown in FIG. 12a;

FIG. 13a is a schematic representation of a powertrain having a planetary transmission incorporating another family member of the present invention;

FIG. 13b is a truth table and chart depicting some of the operating characteristics of the powertrain shown in FIG. 13a;

FIG. 14a is a schematic representation of a powertrain having a planetary transmission incorporating another family member of the present invention; and FIG. 14b is a truth table and chart depicting some of the operating characteristics of the powertrain shown in FIG. 14a.

DESCRIPTION OF THE PREFERRED EMBODIMENTS

Figures 1A, 1B:
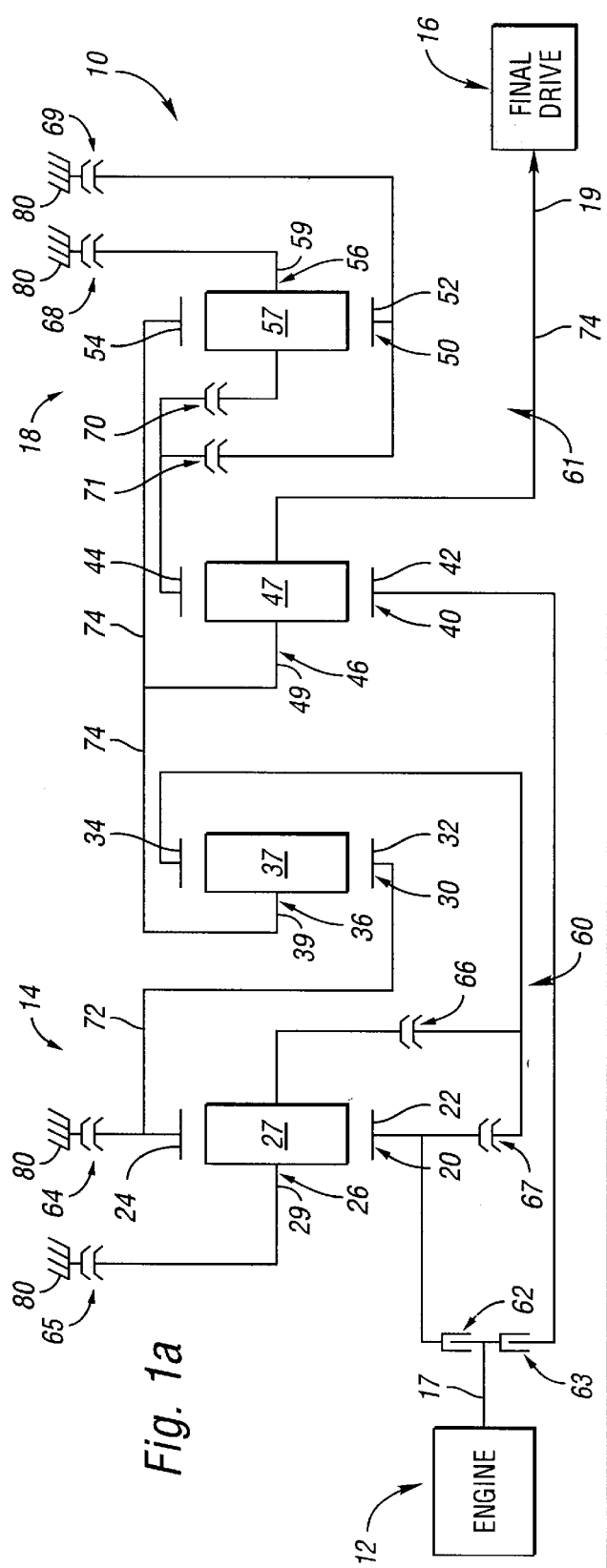

Referring to the drawings, wherein like characters represent the same or corresponding parts throughout the several views, there is shown in FIG. 1a a powertrain 10 having a conventional engine 12, a planetary transmission 14, and a conventional final drive mechanism 16.

The planetary transmission 14 includes an input shaft 17 continuously connected with the engine 12, a planetary gear arrangement 18, and an output shaft 19 continuously connected with the final drive mechanism 16. The planetary gear arrangement 18 includes four planetary gear sets 20, 30, 40 and 50.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on a carrier member 49 and disposed in meshing relationship with both the sun gear member 42 and the ring gear member 44.

The planetary gear set 50 includes a sun gear member 52, a ring gear member 54, and a planet carrier assembly member 56. The planet carrier assembly member 56 includes a plurality of pinion gears 57 rotatably mounted on a carrier member 59 and disposed in meshing relationship with both the sun gear member 52 and the ring gear member 54.

As a result of the dual clutch arrangement of the invention, the four planetary gear sets 20, 30, 40 and 50 are divided into first and second transmission subsets 60, 61 which are alternatively engaged to provide odd number and even number speed ranges, respectively. Transmission subset 60 includes planetary gear sets 20 and 30, and transmission subset 61 includes planetary gear sets 40 and 50. The output shaft 19 is continuously connected with members of both subsets 60 and 61.

As mentioned above, the first and second input clutches 62, 63 are alternatively engaged for transmitting power from the input shaft 17 to transmission subset 60 or transmission subset 61. The first and second input clutches 62, 63 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 60, 61 prior to engaging the respective input clutches 62, 63. The preselection is achieved by means of electronically controlled synchronizers. As shown, the planetary gear arrangement includes eight torque transmitting mechanisms 64, 65, 66, 67, 68, 69, 70 and 71. The torque transmitting mechanisms 64, 65, 68 and 69 comprise braking synchronizers, and the torque transmitting mechanisms 66, 67, 70 and 71 comprise rotating synchronizers.

The rotating synchronizers and braking synchronizers are referred to in the claims as follows: first and second torque transmitting mechanisms 66, 67; third and fourth torque transmitting mechanisms 70, 71; fifth and sixth torque transmitting mechanisms 64, 65; and seventh and eighth torque transmitting mechanisms 68, 69. The other family members are similarly referenced in the claims (i.e. rotating synchronizers generally in order of planetary gear sets from left to right in Figures; and braking synchronizers generally in order of planetary gear sets from left to right in Figures).

By way of example, synchronizers which may be implemented as the rotating and/or braking synchronizers referenced herein are shown in the following patents, each of which are incorporated by reference in their entirety: U.S. Pat. Nos. 5,651,435; 5,975,263; 5,560,461; 5,641,045; 5,497,867; 6,354,416.

Accordingly, the input shaft 17 is alternately connected with the first and second transmission subsets 60, 61 (i.e. through the clutch 62 to the sun gear member 22 and through the clutch 63 to the sun gear member 42). The ring gear member 24 is continuously connected with the sun gear member 32 through the interconnecting member 72. The planet carrier assembly member 36 is continuously connected with the planet carrier assembly member 46, the sun gear member 54 and the output shaft 19 through the interconnecting member 74.

The sun gear member 22 is selectively connectable with the input shaft 17 through the input clutch 62. The sun gear member 42 is selectively connectable with the input shaft 17 through the input clutch 63. The sun gear member 24 is selectively connectable with the transmission housing 80 through the braking synchronizer 64. The planet carrier assembly member 26 is selectively connectable with the transmission housing 80 through the braking synchronizer 65. The planet carrier assembly member 26 is selectively connectable with the ring gear member 34 through the synchronizer 66. The ring gear member 34 is selectively connectable with the sun gear member 22 through the synchronizer 67. The planet carrier assembly member 56 is selectively connectable with the transmission housing 80 through the braking synchronizer 68. The sun gear member 52 is selectively connectable with the transmission housing 80 through the braking synchronizer 69. The ring gear member 44 is selectively connectable with the planet carrier assembly member 56 through the synchronizer 70. The ring gear member 44 is selectively connectable with the sun gear member 52 through the synchronizer 71.

As shown in FIG. 1b, and in particular the truth table disclosed therein, the input clutches and torque transmitting mechanisms are selectively engaged in combinations of three to provide six forward speed ratios and a reverse speed ratio.

The reverse speed ratio is established with the engagement of the input clutch 62, the braking synchronizer 65 and the synchronizer 66. The input clutch 62 connects the sun gear member 22 to the input shaft 17. The braking synchronizer 65 connects the planet carrier assembly member 26 to the transmission housing 80. The synchronizer 66 connects the planet carrier assembly member 26 to the ring gear member 34. The sun gear member 22 rotates at the same speed as the input shaft 17. The planet carrier assembly member 26 and the ring gear member 34 do not rotate. The ring gear member 24 rotates at the same speed as the sun gear member 32. The ring gear member 24 rotates at a speed determined from the speed of the sun gear member 22 and the ring gear/sun gear tooth ratio of the planetary gear set 20. The planet carrier assembly member 36 and the planet carrier assembly member 46 rotate at the same speed as the output shaft 19. The planet carrier assembly member 36, and therefore the output shaft 19, rotates at a speed determined from the speed of the sun gear member 32 and the ring gear/sun gear tooth ratio of the planetary gear set 30. The numerical value of the reverse speed ratio is determined utilizing the ring gear/sun gear tooth ratios of the planetary gear sets 20, 30.

The first forward speed ratio is established with the engagement of the input clutch 63, the braking synchronizer 68 and the synchronizer 71. The input clutch 63 connects the sun gear member 42 to the input shaft 17. The braking synchronizer 68 connects the planet carrier assembly member 56 to the transmission housing 80. The synchronizer 71 connects the ring gear member 44 to the sun gear member 52. The sun gear member 42 rotates at the same speed as the input shaft 17. The planet carrier assembly member 46 and the ring gear member 54 rotate at the same speed as the output shaft 19. The ring gear member 44 rotates at the same speed as the sun gear member 52. The planet carrier assembly member 46, and therefore the output shaft 19, rotates at a speed determined from the speed of the ring gear member 44, the speed of the sun gear member 42 and the ring gear/sun gear tooth ratio of the planetary gear set 40. The planet carrier assembly member 56 does not rotate. The ring gear member 54 rotates at a speed determined from the speed of the sun gear member 52 and the ring gear/sun gear tooth ratio of the planetary gear set 50. The numerical value of the first forward speed ratio is determined utilizing the ring gear/sun gear tooth ratios of the planetary gear sets 40, 50.

The second forward speed ratio is established with the engagement of the input clutch 62, the braking synchronizer 64 and the synchronizer 66. The input clutch 62 connects the sun gear member 22 to the input shaft 17. The braking synchronizer 64 connects the ring gear member 24 to the transmission housing 80. The synchronizer 66 connects the ring gear member 34 to the planet carrier assembly member 26. The sun gear member 22 rotates at the same speed as the input shaft 17. The planet carrier assembly member 26 rotates at the same speed as the ring gear member 34. The ring gear member 24 and the sun gear member 32 do not rotate. The planet carrier assembly member 26 rotates at a speed determined from the speed of the sun gear member 22 and the ring gear/sun gear tooth ratio of the planetary gear set 20. The planet carrier assembly member 36 and the planet carrier assembly member 46 rotate at the same speed as the output shaft 19. The planet carrier assembly member 36, and therefore the output shaft 19, rotates at a speed determined from the speed of the ring gear member 34 and the ring gear/sun gear tooth ratio of the planetary gear set 30. The numerical value of the second forward speed ratio is determined utilizing the ring gear/sun gear tooth ratios of the planetary gear sets 20, 30.

The third forward speed ratio is established with the engagement of the input clutch 63, the braking synchronizer 68 and the synchronizer 70. The input clutch 63 connects the sun gear member 42 to the input shaft 17. The braking synchronizer 68 connects the planet carrier assembly member 56 to the transmission housing 80. The synchronizer 70 connects the ring gear member 44 to the planet carrier assembly member 56. The sun gear member 42 rotates at the same speed as the input shaft 17. The planet carrier assembly member 46 and the ring gear member 54 rotate at the same speed as the output shaft 19. The ring gear member 44 and the planet carrier assembly member 56 do not rotate. The planet carrier assembly member 46, and therefore the output shaft 19, rotates at a speed determined from the speed of the sun gear member 42 and the ring gear/sun gear tooth ratio of the planetary gear set 40. The numerical value of the third forward speed ratio is determined utilizing the ring gear/sun gear tooth ratio of the planetary gear set 40.

The fourth forward speed ratio is established with the engagement of the input clutch 62, the braking synchronizer 65 and the synchronizer 67. The input clutch 62 connects the sun gear member 22 to the input shaft 17. The braking synchronizer 65 connects the planet carrier assembly member 26 to the transmission housing 80. The synchronizer 67 connects the sun gear member 22 to the ring gear member 34. The sun gear member 22 and the ring gear member 34 rotate at the same speed as the input shaft 17. The planet carrier assembly member 26 does not rotate. The ring gear member 24 rotates at the same speed as the sun gear member 32. The ring gear member 24 rotates at a speed determined from the speed of the sun gear member 22 and the ring gear/sun gear tooth ratio of the planetary gear set 20. The planet carrier assembly member 36 and the planet carrier assembly member 46 rotate at the same speed as the output shaft 19. The planet carrier assembly member 36, and therefore the output shaft 19, rotates at a speed determined from the speed of the ring gear member 34, the speed of the sun gear member 32 and the ring gear/sun gear tooth ratio of the planetary gear set 30. The numerical value of the fourth forward speed ratio is determined utilizing the ring gear/sun gear tooth ratios of the planetary gear sets 20, 30.

The fifth forward speed ratio is established with the engagement of the input clutch 63, the braking synchronizer 69 and the synchronizer 70. The input clutch 63 connects the sun gear member 42 to the input shaft 17. The braking synchronizer 69 connects the sun gear member 52 to the transmission housing 80. The synchronizer 70 connects the ring gear member 44 to the planet carrier assembly member 56. The sun gear member 42 rotates at the same speed as the input shaft 17. The planet carrier assembly member 46 and the ring gear member 54 rotate at the same speed as the output shaft 19. The ring gear member 44 rotates at the same speed as the planet carrier assembly member 56. The planet carrier assembly member 46, and therefore the output shaft 19, rotates at a speed determined from the speed of the ring gear member 44, the speed of the sun gear member 42 and the ring gear/sun gear tooth ratio of the planetary gear set 40. The sun gear member 52 does not rotate. The ring gear member 54 rotates at a speed determined from the speed of the planet carrier assembly member 56 and the ring gear/sun gear tooth ratio of the planetary gear set 50. The numerical value of the fifth forward speed ratio is determined utilizing the ring gear/sun gear tooth ratios of the planetary gear sets 40, 50.

The sixth forward speed ratio is established with the engagement of the input clutch 62, and the synchronizers 66, 67. In this configuration, the input shaft 17 is directly connected to the output shaft 19. The numerical value of the sixth forward speed ratio is 1.

As set forth above, the engagement schedule for the torque transmitting mechanisms is shown in the truth table of FIG. 1b. This truth table also provides an example of speed ratios that are available utilizing the ring gear/sun gear tooth ratios given by way of example in FIG. 1b. The R1/S1 value is the tooth ratio of the planetary gear set 20; the R2/S2 value is the tooth ratio of the planetary gear set 30; the R3/S3 value is the tooth ratio of the planetary gear set 40; and the R4/S4 value is the tooth ratio of the planetary gear set 50. Also, the chart of FIG. 1b describes the ratio steps that are attained utilizing the sample of tooth ratios given. For example, the step ratio between first and second forward speed ratios is 1.76, while the step ratio between the reverse and first forward ratio is −0.76.

Figures 2A, 2B:
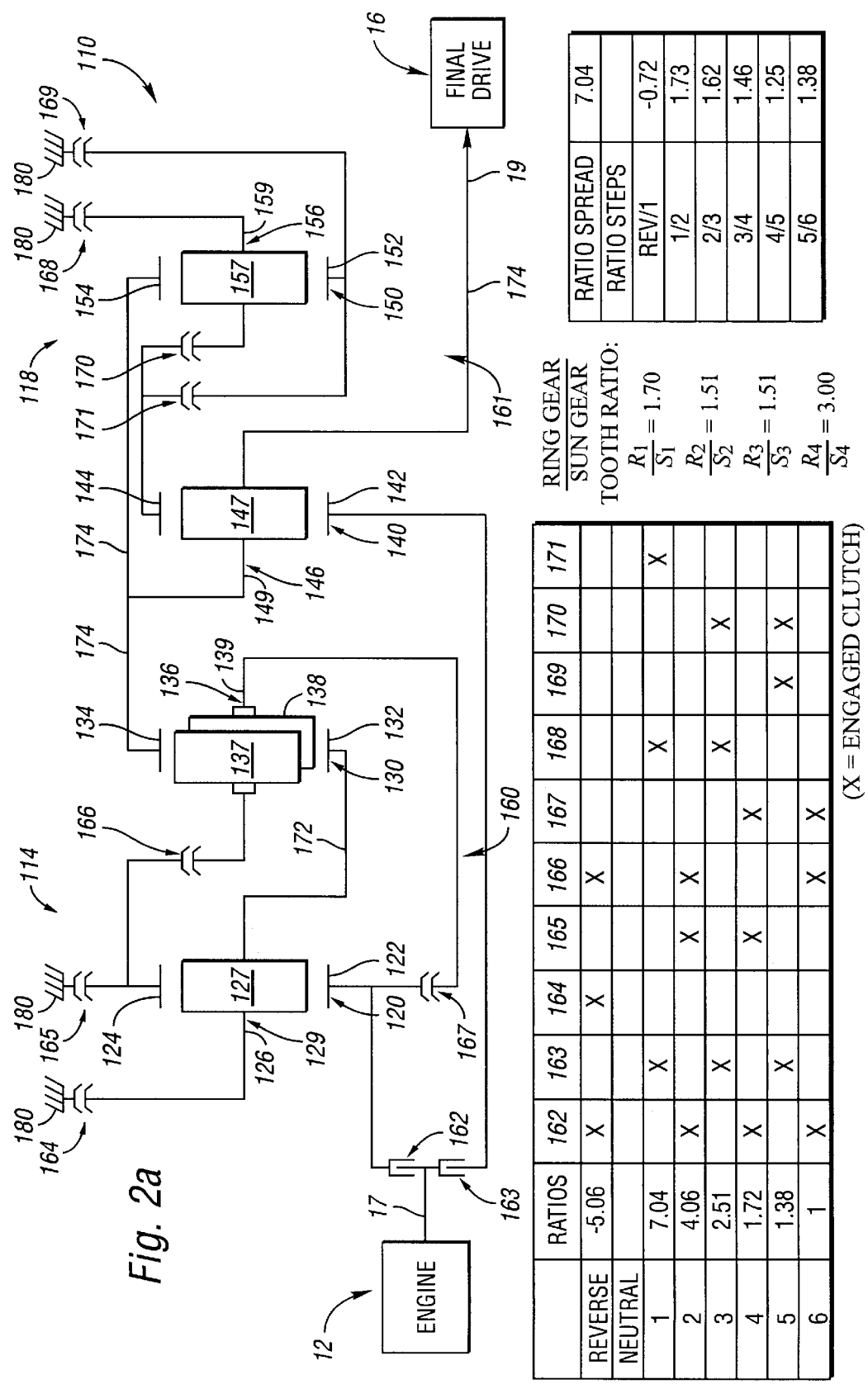

FIG. 2a shows a powertrain 110 having a conventional engine 12, a planetary transmission 114, and a conventional final drive mechanism 16. The planetary transmission 114 includes an input shaft 17 connected with the engine 12, a planetary gear arrangement 118, and an output shaft 19 connected with the final drive mechanism 16. The planetary gear arrangement 118 includes four planetary gear sets 120, 130, 140 and 150.

The planetary gear set 120 includes a sun gear member 122, a ring gear member 124, and a planet carrier assembly member 126. The planet carrier assembly member 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of intermeshing pinion gears 137, 138 rotatably mounted on a carrier member 139 and disposed in meshing relationship with the ring gear member 134 and the sun gear member 132, respectively.

The planetary gear set 140 includes a sun gear member 142, a ring gear member 144, and a planet carrier assembly member 146. The planet carrier assembly member 146 includes a plurality of pinion gears 147 rotatably mounted on a carrier member 149 and disposed in meshing relationship with both the sun gear member 142 and the ring gear member 144.

The planetary gear set 150 includes a sun gear member 152, a ring gear member 154, and a planet carrier assembly member 156. The planet carrier assembly member 156 includes a plurality of pinion gears 157 rotatably mounted on a carrier member 159 and disposed in meshing relationship with both the sun gear member 152 and the ring gear member 154.

As a result of the dual clutch arrangement of the invention, the four planetary gear sets 120, 130, 140 and 150 are divided into first and second transmission subsets 160, 161 which are alternatively engaged to provide odd number and even number speed ranges, respectively. Transmission subset 160 includes planetary gear sets 120 and 130, and transmission subset 161 includes planetary gear sets 140 and 150. The output shaft 19 is continuously connected with members of both subsets 160 and 161.

As mentioned above, the first and second input clutches 162, 163 are alternatively engaged for transmitting power from the input shaft 17 to transmission subset 160 or transmission subset 161. The first and second input clutches 162, 163 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 160, 161 prior to engaging the respective input clutches 162, 163. The preselection is achieved by means of electronically controlled synchronizers. As shown, the planetary gear arrangement includes eight torque transmitting mechanisms 164, 165, 166, 167, 168, 169, 170 and 171. The torque transmitting mechanisms 164, 165, 168 and 169 comprise braking synchronizers, and the torque transmitting mechanisms 166, 167, 170 and 171 comprise rotating synchronizers.

Accordingly, the input shaft 17 is alternately connected with the first and second transmission subsets 160, 161 (i.e. through the clutch 162 to the sun gear member 122 and through the clutch 163 to the sun gear member 142). The planet carrier assembly member 126 is continuously connected with the sun gear member 132 through the interconnecting member 172. The ring gear member 134 is continuously connected with the planet carrier assembly member 146, the ring gear member 154 and the output shaft 19 through the interconnecting member 174.

The sun gear member 122 is selectively connectable with the input shaft 17 through the input clutch 162. The sun gear member 142 is selectively connectable with the input shaft 17 through the input clutch 163. The planet carrier assembly member 126 is selectively connectable with the transmission housing 180 through the braking synchronizer 164. The ring gear member 124 is selectively connectable with the transmission housing 180 through the braking synchronizer 165. The ring gear member 124 is selectively connectable with the planet carrier assembly member 136 through the synchronizer 166. The sun gear member 122 is selectively connectable with the planet carrier assembly member 136 through the synchronizer 167. The planet carrier assembly member 156 is selectively connectable with the transmission housing 180 through the braking synchronizer 168. The sun gear member 152 is selectively connectable with the transmission housing 180 through the braking synchronizer 169. The ring gear member 144 is selectively connectable with the planet carrier assembly member 156 through the synchronizer 170. The ring gear member 144 is selectively connectable with the sun gear member 152 through the synchronizer 171.

As shown in FIG. 2b, and in particular the truth table disclosed therein, the input clutches and torque transmitting mechanisms are selectively engaged in combinations of three to provide six forward speed ratios and a reverse speed ratio.

The reverse speed ratio is established with the engagement of the input clutch 162, the braking synchronizer 164 and the synchronizer 166. The input clutch 162 connects the sun gear member 122 to the input shaft 17. The braking synchronizer 164 connects the planet carrier assembly member 126 to the transmission housing 180. The synchronizer 166 connects the ring gear member 124 to the planet carrier assembly member 136. The sun gear member 122 rotates at the same speed as the input shaft 17. The planet carrier assembly member 126 and the sun gear member 132 do not rotate. The ring gear member 124 rotates at the same speed as the planet carrier assembly member 136. The ring gear member 124 rotates at a speed determined from the speed of the sun gear member 122 and the ring gear/sun gear tooth ratio of the planetary gear set 120. The ring gear member 134 and the planet carrier assembly member 146 rotate at the same speed as the output shaft 19. The ring gear member 134, and therefore the output shaft 19, rotates at a speed determined from the speed of the planet carrier assembly member 136 and the ring gear/sun gear tooth ratio of the planetary gear set 130. The numerical value of the reverse speed ratio is determined utilizing the ring gear/sun gear tooth ratios of the planetary gear set 120, 130.

The first forward speed ratio is established with the engagement of the input clutch 163, the braking synchronizer 168 and the synchronizer 171. The input clutch 163 connects the sun gear member 142 to the input shaft 17. The braking synchronizer 168 connects the planet carrier assembly member 156 to the transmission housing 180. The synchronizer 171 connects the ring gear member 144 to the sun gear member 152. The sun gear member 142 rotates at the same speed as the input shaft 17. The planet carrier assembly member 146 and the ring gear member 154 rotate at the same speed as the output shaft 19. The ring gear member 144 rotates at the same speed as the sun gear member 152. The planet carrier assembly member 146, and therefore the output shaft 19, rotates at a speed determined from the speed of the ring gear member 144, the speed of the sun gear member 142 and the ring gear/sun gear tooth ratio of the planetary gear set 140. The planet carrier assembly member 156 does not rotate. The ring gear member 154 rotates at a speed determined from the speed of the sun gear member 152 and the ring gear/sun gear tooth ratio of the planetary gear set 150. The numerical value of the first forward speed ratio is determined utilizing the ring gear/sun gear tooth ratios of the planetary gear set 140, 150.

The second forward speed ratio is established with the engagement of the input clutch 162, the braking synchronizer 165 and the synchronizer 166. The input clutch 162 connects the sun gear member 122 to the input shaft 17. The braking synchronizer 165 connects the ring gear member 124 to the transmission housing 180. The synchronizer 166 connects the ring gear member 124 to the planet carrier assembly member 136. The sun gear member 122 rotates at the same speed as the input shaft 17. The planet carrier assembly member 126 rotates at the same speed as the sun gear member 132. The sun gear member 124 and the planet carrier assembly member 136 do not rotate. The planet carrier assembly member 126 rotates at a speed determined from the speed of the sun gear member 122 and the ring gear/sun gear tooth ratio of the planetary gear set 120. The ring gear member 134 and the planet carrier assembly member 146 rotate at the same speed as the output shaft 19. The ring gear member 134, and therefore the output shaft 19, rotates at a speed determined from the speed of the sun gear member 132 and the ring gear/sun gear tooth ratio of the planetary gear set 130. The numerical value of the second forward speed ratio is determined utilizing the ring gear/sun gear tooth ratios of the planetary gear sets 120, 130.

The third forward speed ratio is established with the engagement of the input clutch 163, the braking synchronizer 168 and the synchronizer 170. The input clutch 163 connects the sun gear member 142 to the input shaft 17. The braking synchronizer 168 connects the planet carrier assembly member 156 to the transmission housing 180. The synchronizer 170 connects the ring gear member 144 to the planet carrier assembly member 156. The sun gear member 142 rotates at the same speed as the input shaft 17. The planet carrier assembly member 146 and the ring gear member 154 rotate at the same speed as the output shaft 19. The ring gear member 144 and the planet carrier assembly member 156 do not rotate. The planet carrier assembly member 146, and therefore the output shaft 19, rotates at a speed determined from the speed of the sun gear member 142 and the ring gear/sun gear tooth ratio of the planetary gear set 140. The numerical value of the third forward speed ratio is determined utilizing the ring gear/sun gear tooth ratio of the planetary gear set 140.

The fourth forward speed ratio is established with the engagement of the input clutch 162, the braking synchronizer 165 and the synchronizer 167. The input clutch 162 connects the sun gear member 122 to the input shaft 17. The braking synchronizer 165 connects the ring gear member 124 to the transmission housing 180. The synchronizer 167 connects the sun gear member 122 to the planet carrier assembly member 136. The sun gear member 122 and the planet carrier assembly member 136 rotate at the same speed as the input shaft 17. The planet carrier assembly member 126 rotates at the same speed as the sun gear member 132. The ring gear member 124 does not rotate. The planet carrier assembly member 126 rotates at a speed determined from the speed of the sun gear member 122 and the ring gear/sun gear tooth ratio of the planetary gear set 120. The ring gear member 134 and the planet carrier assembly member 146 rotate at the same speed as the output shaft 19. The ring gear member 134, and therefore the output shaft 19, rotates at a speed determined from the speed of the planet carrier assembly member 136, the speed of the sun gear member 132 and the ring gear/sun gear tooth ratio of the planetary gear set 130. The numerical value of the fourth forward speed ratio is determined utilizing the ring gear/sun gear tooth ratios of the planetary gear sets 120, 130.

The fifth forward speed ratio is established with the engagement of the input clutch 163, the braking synchronizer 169 and the synchronizer 170. The input clutch 163 connects the sun gear member 142 to the input shaft 17. The braking synchronizer 169 connects the sun gear member 152 to the transmission housing 180. The synchronizer 170 connects the ring gear member 144 to the planet carrier assembly member 156. The sun gear member 142 rotates at the same speed as the input shaft 17. The planet carrier assembly member 146 and the ring gear member 154 rotate at the same speed as the output shaft 19. The ring gear member 144 rotates at the same speed as the planet carrier assembly member 156. The planet carrier assembly member 146, and therefore the output shaft 19, rotates at a speed determined from the speed of the ring gear member 144, the speed of the sun gear member 142 and the ring gear/sun gear tooth ratio of the planetary gear set 140. The sun gear member 152 does not rotate. The ring gear member 154 rotates at a speed determined from the speed of the planet carrier assembly member 156 and the ring gear/sun gear tooth ratio of the planetary gear set 150. The numerical value of the fifth forward speed ratio is determined utilizing the ring gear/sun gear tooth ratios of the planetary gear sets 140, 150.

The sixth forward speed ratio is established with the engagement of the input clutch 162, and the synchronizers 166, 167. In this configuration, the input shaft 17 is directly connected to the output shaft 19. The numerical value of the sixth forward speed ratio is 1.

As set forth above, the truth table of FIG. 2b describes the engagement sequence of the torque transmitting mechanisms utilized to provide a reverse drive ratio and six forward speed ratios. The truth table also provides an example of the ratios that can be attained with the family members shown in FIG. 2a utilizing the sample tooth ratios given in FIG. 2b. The R1/S1 value is the tooth ratio of the planetary gear set 120; the R2/S2 value is the tooth ratio of the planetary gear set 130; the R3/S3 value is the tooth ratio of the planetary gear set 140; and the R4/S4 value is the tooth ratio of the planetary gear set 150. Also shown in FIG. 2b are the ratio steps between single step ratios in the forward direction as well as the reverse to first ratio step. For example, the first to second step ratio is 1.73.

Turning the FIG. 3a, a powertrain 210 having a conventional engine 12, a planetary transmission 214, and conventional final drive mechanism 16 is shown.

The planetary transmission 214 includes an input shaft 17 continuously connected with the engine 12, a planetary gear arrangement 218, and an output shaft 19 continuously connected with the final drive mechanism 16. The planetary gear arrangement 218 includes four planetary gear sets 220, 230, 240 and 250.

The planetary gear set 220 includes a sun gear member 222, a ring gear member 224, and a planet carrier assembly member 226. The planet carrier assembly member 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gear set 240 includes a sun gear member 242, a ring gear member 244, and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

The planetary gear set 250 includes a sun gear member 252, a ring gear member 254, and a planet carrier assembly member 256. The planet carrier assembly member 256 includes a plurality of pinion gears 257 rotatably mounted on a carrier member 259 and disposed in meshing relationship with both the sun gear member 252 and the ring gear member 254.

As a result of the dual clutch arrangement of the invention, the four planetary gear sets 220, 230, 240 and 250 are divided into first and second transmission subsets 260, 261 which are alternatively engaged to provide odd number and even number speed ranges, respectively. Transmission subset 260 includes planetary gear sets 220 and 230, and transmission subset 261 includes planetary gear sets 240 and 250. The output shaft 19 is continuously connected with members of both subsets 260 and 261.

As mentioned above, the first and second input clutches 262, 263 are alternatively engaged for transmitting power from the input shaft 17 to transmission subset 260 or transmission subset 261. The first and second input clutches 262, 263 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 260, 261 prior to engaging the respective input clutches 262, 263. The preselection is achieved by means of electronically controlled synchronizers. As shown, the planetary gear arrangement includes eight torque transmitting mechanisms 264, 265, 266, 267, 268, 269, 270 and 271. The torque transmitting mechanisms 264, 265, 268 and 269 comprise braking synchronizers, and the torque transmitting mechanisms 266, 267, 270 and 271 comprise rotating synchronizers.

Accordingly, the input shaft 17 is alternately connected with the first and second transmission subsets 260, 261 (i.e. through the clutch 262 to the sun gear member 222 and through the clutch 263 to the sun gear member 242). The ring gear member 224 is continuously connected with the sun gear member 232 through the interconnecting member 272. The planet carrier assembly member 236 is continuously connected with the planet carrier assembly member 246, the ring gear member 254 and the output shaft 19 through the interconnecting member 274.

The sun gear member 222 is selectively connectable with the input shaft 17 through the input clutch 262. The sun gear member 242 is selectively connectable with the input shaft 17 through the input clutch 263. The ring gear member 224 is selectively connectable with the transmission housing 280 through the braking synchronizer 264. The planet carrier assembly member 226 is selectively connectable with the transmission housing 280 through the braking synchronizer 265. The sun gear member 222 is selectively connectable with the ring gear member 234 through the synchronizer 266. The planet carrier assembly member 226 is selectively connectable with the ring gear member 234 through the synchronizer 267. The planet carrier assembly member 256 is selectively connectable with the transmission housing 280 through the braking synchronizer 268. The sun gear member 252 is selectively connectable with the transmission housing 280 through the braking synchronizer 269. The ring gear member 244 is selectively connectable with the planet carrier assembly member 256 through the synchronizer 270. The ring gear member 244 is selectively connectable with the sun gear member 252 through the synchronizer 271.

As shown in FIG. 3b, and in particular the truth table disclosed therein, the input clutches and torque transmitting mechanisms are selectively engaged in combinations of three to provide six forward speed ratios and a reverse speed ratio.

The reverse speed ratio is established with the engagement of the input clutch 262, the braking synchronizer 265 and the synchronizer 267. The input clutch 262 connects the sun gear member 222 to the input shaft 17. The braking synchronizer 265 connects the planet carrier assembly member 226 to the transmission housing 280. The synchronizer 267 connects the planet carrier assembly member 226 to the ring gear member 234. The sun gear member 222 rotates at the same speed as the input shaft 17. The planet carrier assembly member 226 and the ring gear member 234 do not rotate. The ring gear member 224 rotates at the same speed as the sun gear member 232. The ring gear member 224 rotates at a speed determined from the speed of the sun gear member 222 and the ring gear/sun gear tooth ratio of the planetary gear set 220. The planet carrier assembly member 236 and the planet carrier assembly member 246 rotate at the same speed as the output shaft 19. The planet carrier assembly member 236, and therefore the output shaft 19, rotates at a speed determined from the speed of the sun gear member 232 and the ring gear/sun gear tooth ratio of the planetary gear set 230. The numerical value of the reverse speed ratio is determined utilizing the ring gear/sun gear tooth ratios of the planetary gear sets 220, 230.

The first forward speed ratio is established with the engagement of the input clutch 263, the braking synchronizer 268 and the synchronizer 271. The input clutch 263 connects the sun gear member 242 to the input shaft 17. The braking synchronizer 268 connects the planet carrier assembly member 256 to the transmission housing 280. The synchronizer 271 connects the ring gear member 244 to the sun gear member 252. The sun gear member 242 rotates at the same speed as the input shaft 17. The planet carrier assembly member 246 and the ring gear member 254 rotate at the same speed as the output shaft 19. The ring gear member 244 rotates at the same speed as the sun gear member 252. The planet carrier assembly member 246, and therefore the output shaft 19, rotates at a speed determined from the speed of the ring gear member 244, the speed of the sun gear member 242 and the ring gear/sun gear tooth ratio of the planetary gear set 240. The planet carrier assembly member 256 does not rotate. The ring gear member 254 rotates at a speed determined from the speed of the sun gear member 252 and the ring gear/sun gear tooth ratio of the planetary gear set 250. The numerical value of the first forward speed ratio is determined utilizing the ring gear/sun gear tooth ratios of the planetary gear sets 240, 250.

The second forward speed ratio is established with the engagement of the input clutch 262, the braking synchronizer 264 and the synchronizer 267. The input clutch 262 connects the sun gear member 222 to the input shaft 17. The braking synchronizer 264 connects the ring gear member 224 to the transmission housing 280. The synchronizer 267 connects the planet carrier assembly member 226 to the ring gear member 234. The sun gear member 222 rotates at the same speed as the input shaft 17. The planet carrier assembly member 226 rotates at the same speed as the ring gear member 234. The ring gear member 224 and the sun gear member 232 do not rotate. The planet carrier assembly member 226 rotates at a speed determined from the speed of the sun gear member 222 and the ring gear/sun gear tooth ratio of the planetary gear set 220. The planet carrier assembly member 236 and the planet carrier assembly member 246 rotate at the same speed as the output shaft 19. The planet carrier assembly member 236, and therefore the output shaft 19, rotates at a speed determined from the speed of the ring gear member 234 and the ring gear/sun gear tooth ratio of the planetary gear set 230. The numerical value of the second forward speed ratio is determined utilizing the ring gear/sun gear tooth ratios of the planetary gear sets 220, 230.

The third forward speed ratio is established with the engagement of the input clutch 263, the braking synchronizer 268 and the synchronizer 270. The input clutch 263 connects the sun gear member 242 to the input shaft 17. The braking synchronizer 268 connects the planet carrier assembly member 256 to the transmission housing 280. The synchronizer 270 connects the ring gear member 244 to the planet carrier assembly member 256. The sun gear member 242 rotates at the same speed as the input shaft 17. The planet carrier assembly member 246 and the ring gear member 254 rotate at the same speed as the output shaft 19. The ring gear member 244 and the planet carrier assembly member 256 do not rotate. The planet carrier assembly member 246, and therefore the output shaft 19, rotates at a speed determined from the speed of the sun gear member 242 and the ring gear/sun gear tooth ratio of the planetary gear set 240. The numerical value of the third forward speed ratio is determined utilizing the ring gear/sun gear tooth ratio of the planetary gear set 240.

The fourth forward speed ratio is established with the engagement of the input clutch 262, the braking synchronizer 265 and the synchronizer 266. The input clutch 262 connects the sun gear member 222 to the input shaft 17. The braking synchronizer 265 connects the planet carrier assembly member 226 to the transmission housing 280. The synchronizer 266 connects the sun gear member 222 to the ring gear member 234. The sun gear member 222 and the ring gear member 234 rotate at the same speed as the input shaft 17. The planet carrier assembly member 226 does not rotate. The ring gear member 224 rotates at the same speed as the sun gear member 232. The ring gear member 224 rotates at a speed determined from the speed of the sun gear member 222 and the ring gear/sun gear tooth ratio of the planetary gear set 220. The planet carrier assembly member 236 and the planet carrier assembly member 246 rotate at the same speed as the output shaft 19. The planet carrier assembly member 236, and therefore the output shaft 19, rotates at a speed determined from the speed of the ring gear member 234, the speed of the sun gear member 232 and the ring gear/sun gear tooth ratio of the planetary gear set 230. The numerical value of the fourth forward speed ratio is determined utilizing the ring gear/sun gear tooth ratios of the planetary gear set 220, 230.

The fifth forward speed ratio is established with the engagement of the input clutch 263, the braking synchronizer 269 and the synchronizer 270. The input clutch 263 connects the sun gear member 242 to the input shaft 17. The braking synchronizer 269 connects the sun gear member 252 to the transmission housing 280. The synchronizer 270 connects the ring gear member 244 to the planet carrier assembly member 256. The sun gear member 242 rotates at the same speed as the input shaft 17. The planet carrier assembly member 246 and the ring gear member 254 rotate at the same speed as the output shaft 19. The ring gear member 244 rotates at the same speed as the planet carrier assembly member 256. The planet carrier assembly member 246, and therefore the output shaft 19, rotates at a speed determined from the speed of the ring gear member 244, the speed of the sun gear member 242 and the ring gear/sun gear tooth ratio of the planetary gear set 240. The sun gear member 252 does not rotate. The ring gear member 254 rotates at a speed determined from the speed of the planet carrier assembly member 256 and the ring gear/sun gear tooth ratio of the planetary gear set 250. The numerical value of the fifth forward speed ratio is determined utilizing the ring gear/sun gear tooth ratios of the planetary gear sets 240, 250.

The sixth forward speed ratio is established with the engagement of the input clutch 262, and the synchronizers 266, 267. In this configuration, the input shaft 17 is directly connected to the output shaft 19. The numerical value of the sixth forward speed ratio is 1.

As previously set forth, the truth table of FIG. 3b describes the combinations of engagements utilized for six forward speed ratios and one reverse speed ratio. The truth table also provides an example of speed ratios that are available with the family member described above. These examples of speed ratios are determined the tooth ratios given in FIG. 3b. The R1/S1 value is the tooth ratio of the planetary gear set 220; the R2/S2 value is the tooth ratio of the planetary gear set 230; the R3/S3 value is the tooth ratio of the planetary gear set 240; and the R4/S4 value is the tooth ratio of the planetary gear set 250. Also depicted in FIG. 3b is a chart representing the ratio steps between adjacent forward speed ratios and the reverse speed ratio. For example, the first to second ratio interchange has a step of 1.83.

Figures 4A, 4B:
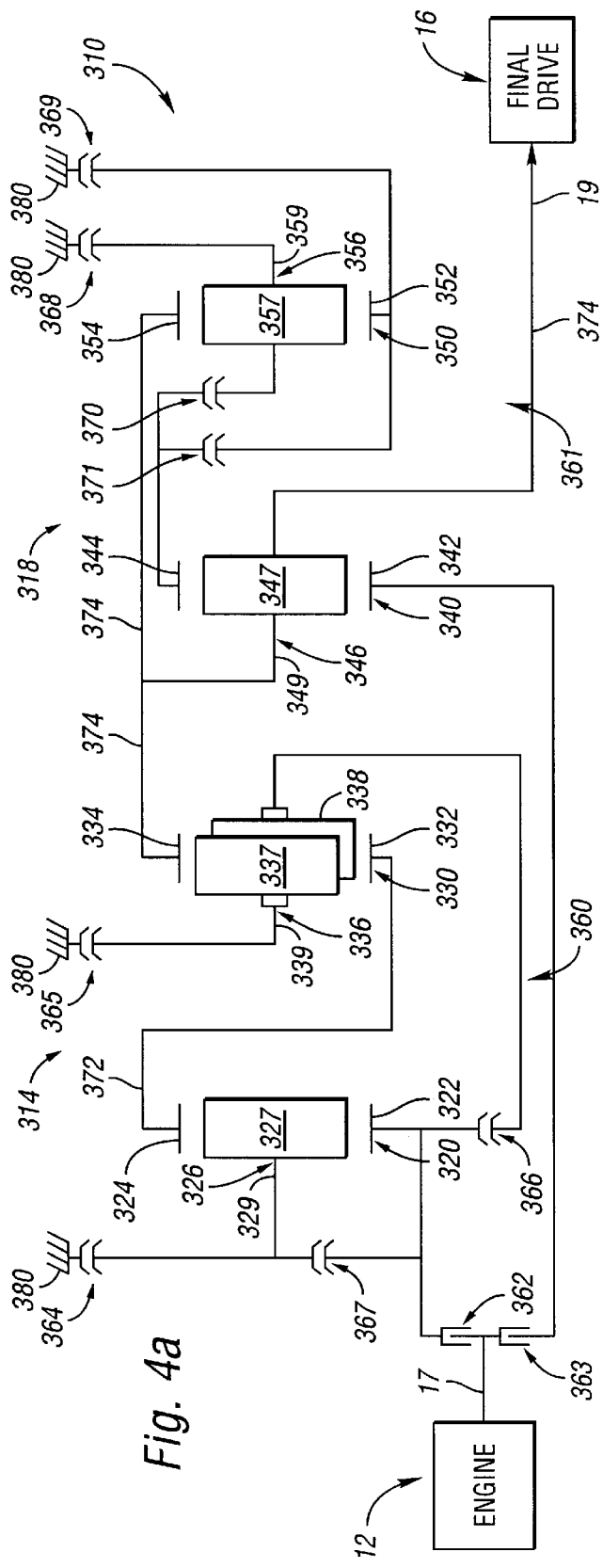

A powertrain 310, shown in FIG. 4a, includes the engine 12, a planetary transmission 314, and the final drive mechanism 16. The planetary transmission 314 includes an input shaft 17 continuously connected with the engine 12, a planetary gear arrangement 318, and an output shaft 19 continuously connected with the final drive mechanism 16. The planetary gear arrangement 318 includes four planetary gear sets 320, 330, 340 and 350.

The planetary gear set 320 includes a sun gear member 322, a ring gear member 324, and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of intermeshing pinion gears 337, 338 rotatably mounted on a carrier member 339 and disposed in meshing relationship with the ring gear member 334 and the sun gear member 332, respectively.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear set 350 includes a sun gear member 352, a ring gear member 354, and a planet carrier assembly member 356. The planet carrier assembly member 356 includes a plurality of pinion gears 357 rotatably mounted on a carrier member 359 and disposed in meshing relationship with both the sun gear member 352 and the ring gear member 354.

As a result of the dual clutch arrangement of the invention, the four planetary gear sets 320, 330, 340 and 350 are divided into first and second transmission subsets 360, 361 which are alternatively engaged to provide odd number and even number speed ranges, respectively. Transmission subset 360 includes planetary gear sets 320 and 330, and transmission subset 361 includes planetary gear sets 340 and 350. The output shaft 19 is continuously connected with members of both subsets 360 and 361.

As mentioned above, the first and second input clutches 362, 363 are alternatively engaged for transmitting power from the input shaft 17 to transmission subset 360 or transmission subset 361. The first and second input clutches 362, 363 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 360, 361 prior to engaging the respective input clutches 362, 363. The preselection is achieved by means of electronically controlled synchronizers. As shown, the planetary gear arrangement includes eight torque transmitting mechanisms 364, 365, 366, 367, 368, 369, 370 and 371. The torque transmitting mechanisms 364, 365, 368 and 369 comprise braking synchronizers, and the torque transmitting mechanisms 366, 367, 370 and 371 comprise rotating synchronizers.

Accordingly, the input shaft 17 is alternately connected with the first and second transmission subsets 360, 361 (i.e. through the clutch 362 to the sun gear member 322 and through the clutch 363 to the sun gear member 342). The ring gear member 324 is continuously connected with the sun gear member 332 through the interconnecting member 372. The ring gear member 334 is continuously connected with the planet carrier assembly member 346, the ring gear member 354 and the output shaft 19 through the interconnecting member 374.

The sun gear member 322 is selectively connectable with the input shaft 17 through the input clutch 362. The sun gear member 342 is selectively connectable with the input shaft 17 through the input clutch 363. The planet carrier assembly member 326 is selectively connectable with the transmission housing 380 through the braking synchronizer 364. The planet carrier assembly member 336 is selectively connectable with the transmission housing 380 through the braking synchronizer 365. The sun gear member 322 is selectively connectable with the planet carrier assembly member 336 through the synchronizer 366. The planet carrier assembly member 326 is selectively connectable with the sun gear member 322 through the synchronizer 367. The planet carrier assembly member 356 is selectively connectable with the transmission housing 380 through the braking synchronizer 368. The sun gear member 352 is selectively connectable with the transmission housing 380 through the braking synchronizer 369. The ring gear member 344 is selectively connectable with the planet carrier assembly member 356 through the synchronizer 370. The ring gear member 344 is selectively connectable with the sun gear member 352 through the synchronizer 371.

The truth tables given in FIGS. 4b, 5b, 6b, 7b, 8b, 9b, 10b, 11b, 12b, 13b and 14b show the engagement sequences for the torque transmitting mechanisms to provide at least five forward speed ratios and one reverse speed ratio. As shown and described above for the configurations in FIGS. 1a, 2a and 3a, those skilled in the art will understand from the respective truth tables how the speed ratios are established through the planetary gear sets identified in the written description.

The truth table shown in FIG. 4b describes the engagement combination and engagement sequence necessary to provide the reverse drive ratio and six forward speed ratios. A sample of the numerical values for the ratios is also provided in the truth table of FIG. 4b. These values are determined utilizing the ring gear/sun gear tooth ratios also given in FIG. 4b. The R1/S1 value is the tooth ratio for the planetary gear set 320; the R2/S2 value is the tooth ratio for the planetary gear set 330; the R3/S3 value is the tooth ratio for the planetary gear set 340; and the R4/S4 value is the tooth ratio for the planetary gear set 350. Also given in FIG. 4b is a chart describing the step ratios between the adjacent forward speed ratios and the reverse to first forward speed ratio. For example, the first to second forward speed ratio step is 1.68.

Those skilled in the art will recognize that the numerical values of the reverse and second forward speed ratios are determined utilizing the ring gear/sun gear tooth ratios of the planetary gear sets 320, The numerical values of the first and fifth forward speed ratios are determined utilizing the ring gear/sun gear tooth ratios of the planetary gear sets 340, 350. The numerical value of the third forward speed ratio is determined utilizing the ring gear/sun gear tooth ratio of the planetary gear set 340. The numerical value of the fourth forward speed ratio is determined utilizing the ring gear/sun gear tooth ratio of the planetary gear set 330. The numerical value of the sixth forward speed ratio is 1.

A powertrain 410 shown in FIG. 5a includes a conventional engine 12, a planetary transmission 414, and a conventional final drive mechanism 16. The planetary transmission 414 includes an input shaft 17 connected with the engine 12, a planetary gear arrangement 418, and an output shaft 19 continuously connected with the final drive mechanism 16. The planetary gear arrangement 418 includes four planetary gear sets 420, 430, 440 and 450.

The planetary gear set 420 includes a sun gear member 422, a ring gear member 424, and a planet carrier assembly member 426. The planet carrier assembly member 426 includes a plurality of pinion gears 427 rotatably mounted on a carrier member 429 and disposed in meshing relationship with both the sun gear member 422 and the ring gear member 424.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the sun gear member 432 and the ring gear member 434.

The planetary gear set 440 includes a sun gear member 442, a ring gear member 444, and a planet carrier assembly member 446. The planet carrier assembly member 446 includes a plurality of pinion gears 447 rotatably mounted on a carrier member 449 and disposed in meshing relationship with both the sun gear member 442 and the ring gear member 444.

The planetary gear set 450 includes a sun gear member 452, a ring gear member 454, and a planet carrier assembly member 456. The planet carrier assembly member 456 includes a plurality of intermeshing pinion gears 457, 458 rotatably mounted on a carrier member 459 and disposed in meshing relationship with the ring gear member 454 and the sun gear member 452, respectively.

As a result of the dual clutch arrangement of the invention, the four planetary gear sets 420, 430, 440 and 450 are divided into first and second transmission subsets 460, 461 which are alternatively engaged to provide odd number and even number speed ranges, respectively. Transmission subset 460 includes planetary gear sets 420 and 430, and transmission subset 461 includes planetary gear sets 440 and 450. The output shaft 19 is continuously connected with members of both subsets 460 and 461.

As mentioned above, the first and second input clutches 462, 463 are alternatively engaged for transmitting power from the input shaft 17 to transmission subset 460 or transmission subset 461. The first and second input clutches 462, 463 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 460, 461 prior to engaging the respective input clutches 462, 463. The preselection is achieved by means of electronically controlled synchronizers. As shown, the planetary gear arrangement includes eight torque transmitting mechanisms 464, 465, 466, 467, 468, 469, 470 and 471. The torque transmitting mechanisms 464, 465, 468 and 469 comprise braking synchronizers, and the torque transmitting mechanisms 466, 467, 470 and 471 comprise rotating synchronizers.

Accordingly, the input shaft 17 is alternately connected with the first and second transmission subsets 460, 461 (i.e. through the clutch 462 to the sun gear member 422 and through the clutch 463 to the sun gear member 442). The ring gear member 424 is continuously connected with the sun gear member 432 through the interconnecting member 472. The ring gear member 434 is continuously connected with the planet carrier assembly member 446, the ring gear member 454 and the output shaft 19 through the interconnecting member 474.

The sun gear member 422 is selectively connectable with the input shaft 17 through the input clutch 462. The sun gear member 442 is selectively connectable with the input shaft 17 through the input clutch 463. The planet carrier assembly member 426 is selectively connectable with the transmission housing 480 through the braking synchronizer 464. The planet carrier assembly member 436 is selectively connectable with the transmission housing 480 through the braking synchronizer 465. The sun gear member 422 is selectively connectable with the planet carrier assembly member 436 through the synchronizer 466. The planet carrier assembly member 426 is selectively connectable with the sun gear member 422 through the synchronizer 467. The planet carrier assembly member 456 is selectively connectable with the transmission housing 480 through the braking synchronizer 468. The sun gear member 452 is selectively connectable with the transmission housing 480 through the braking synchronizer 469. The ring gear member 444 is selectively connectable with the planet carrier assembly member 456 through the synchronizer 470. The ring gear member 444 is selectively connectable with the sun gear member 452 through the synchronizer 471.

As shown in FIG. 5b, and in particular the truth table disclosed therein, the input clutches and torque transmitting mechanisms are selectively engaged in combinations of three to provide six forward speed ratios and a reverse speed ratio.

FIG. 5b also provides a chart of the ratio steps between adjacent forward ratios and between the reverse and first ratio. For example, the ratio step between the first and second forward ratios is 1.92. Those skilled in the art will recognize that the numerical value of the reverse speed ratio is determined utilizing the ring gear/sun gear tooth ratio of the planetary gear set 430. The numerical values of the first and fifth forward speed ratios are determined utilizing the ring gear/sun gear tooth ratios of the planetary gear sets 420, 430. The numerical value of the second forward speed ratio is determined utilizing the ring gear/sun gear tooth ratio of the planetary gear set 440. The numerical value of the third forward speed ratio is 1. The numerical values of the fourth and sixth forward speed ratios are determined utilizing the ring gear/sun gear tooth ratios of the planetary gear sets 440, 450.

Figures 6A, 6B:
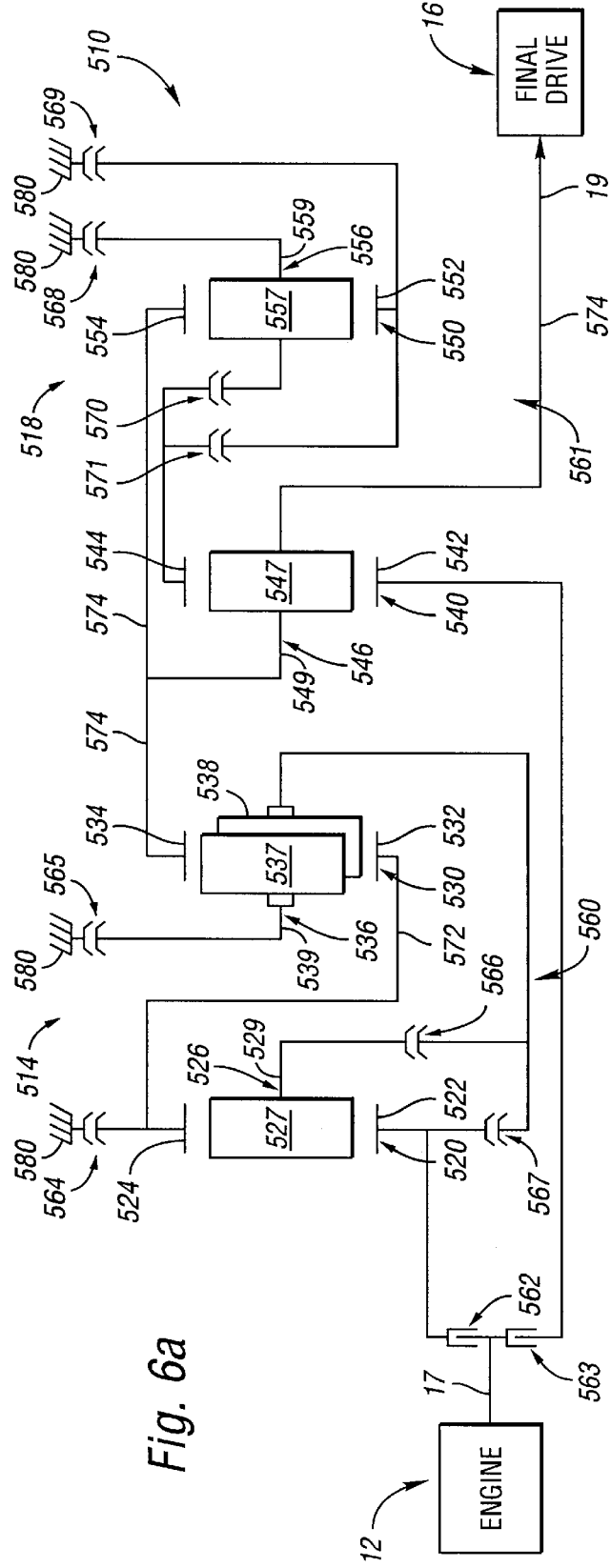

A powertrain 510, shown in FIG. 6a, includes a conventional engine 12, a powertrain 514, and a conventional final drive mechanism 16. The powertrain 514 includes an input shaft 17 connected with the engine 12, a planetary gear arrangement 518, and an output shaft 19 continuously connected with the final drive mechanism 16. The planetary gear arrangement 518 includes four planetary gear sets 520, 530, 540 and 550.

The planetary gear set 520 includes a sun gear member 522, a ring gear member 524, and a planet carrier assembly member 526. The planet carrier assembly member 526 includes a plurality of pinion gears 527 rotatably mounted on a carrier member 529 and disposed in meshing relationship with both the sun gear member 522 and the ring gear member 524.

The planetary gear set 530 includes a sun gear member 532, a ring gear member 534, and a planet carrier assembly member 536. The planet carrier assembly member 536 includes a plurality of intermeshing pinion gears 537, 538 rotatably mounted on a carrier member 539 and disposed in meshing relationship with the ring gear member 534 and the sun gear member 532, respectively.

The planetary gear set 540 includes a sun gear member 542, a ring gear member 544, and a planet carrier assembly member 546. The planet carrier assembly member 546 includes a plurality of pinion gears 547 rotatably mounted on a carrier member 549 and disposed in meshing relationship with both the sun gear member 542 and the ring gear member 544.

The planetary gear set 550 includes a sun gear member 552, a ring gear member 554, and a planet carrier assembly member 556. The planet carrier assembly member 556 includes a plurality of pinion gears 557 rotatably mounted on a carrier member 559 and disposed in meshing relationship with both the sun gear member 552 and the ring gear member 554.

As a result of the dual clutch arrangement of the invention, the four planetary gear sets 520, 530, 540 and 550 are divided into first and second transmission subsets 560, 561 which are alternatively engaged to provide odd number and even number speed ranges, respectively. Transmission subset 560 includes planetary gear sets 520 and 530, and transmission subset 561 includes planetary gear sets 540 and 550. The output shaft 19 is continuously connected with members of both subsets 560 and 561.

As mentioned above, the first and second input clutches 562, 563 are alternatively engaged for transmitting power from the input shaft 17 to transmission subset 560 or transmission subset 561. The first and second input clutches 562, 563 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 560, 561 prior to engaging the respective input clutches 562, 563. The preselection is achieved by means of electronically controlled synchronizers. As shown, the planetary gear arrangement includes eight torque transmitting mechanisms 564, 565, 566, 567, 568, 569, 570 and 571. The torque transmitting mechanisms 564, 565, 568 and 569 comprise braking synchronizers, and the torque transmitting mechanisms 566, 567, 570 and 571 comprise rotating synchronizers.

Accordingly, the input shaft 17 is alternately connected with the first and second transmission subsets 560, 561 (i.e. through the clutch 562 to the sun gear member 522 and through the clutch 563 to the sun gear member 542). The ring gear member 524 is continuously connected with the sun gear member 532 through the interconnecting member 572. The ring gear member 534 is continuously connected with the planet carrier assembly member 546, the ring gear member 554 and the output shaft 19 through the interconnecting member 574.

The sun gear member 522 is selectively connectable with the input shaft 17 through the input clutch 562. The sun gear member 542 is selectively connectable with the input shaft 17 through the input clutch 563. The ring gear member 524 is selectively connectable with the transmission housing 580 through the braking synchronizer 564. The planet carrier assembly member 536 is selectively connectable with the transmission housing 580 through the braking synchronizer 565. The planet carrier assembly member 526 is selectively connectable with the planet carrier assembly member 536 through the synchronizer 566. The sun gear member 522 is selectively connectable with the planet carrier assembly member 536 through the synchronizer 567. The planet carrier assembly member 556 is selectively connectable with the transmission housing 580 through the braking synchronizer 568. The sun gear member 552 is selectively connectable with the transmission housing 580 through the braking synchronizer 569. The ring gear member 544 is selectively connectable with the planet carrier assembly member 556 through the synchronizer 570. The ring gear member 544 is selectively connectable with the sun gear member 552 through the synchronizer 571.

As shown in FIG. 6b, and in particular the truth table disclosed therein, the input clutches and torque transmitting mechanisms are selectively engaged in combinations of three to provide six forward speed ratios and a reverse speed ratio. The chart of FIG. 6b describes the ratio steps between adjacent forward speed ratios and the ratio step between the reverse and first forward speed ratio.

Those skilled in the art, upon reviewing the truth table and the schematic representation of FIG. 6a can determine that the numerical values of the reverse and second forward speed ratios are determined utilizing the ring gear/sun gear tooth ratios of the planetary gear sets 520, 530. The numerical values of the first and fifth forward speed ratios are determined utilizing the ring gear/sun gear tooth ratios of the planetary gear sets 540, 550. The numerical value of the third forward speed ratio is determined utilizing the ring gear/sun gear tooth ratio of the planetary gear set 540. The numerical value of the fourth forward speed ratio is determined utilizing the ring gear/sun gear tooth ratio of the planetary gear set 530. The numerical value of the sixth forward speed ratio is 1.

The sample speed ratios given in the truth table are determined utilizing the tooth ratio values also given in FIG. 6b. R1/S1 value is the tooth ratio of the planetary gear set 520; the R2/S2 value is the tooth ratio of the planetary gear set 530; the R3/S3 value is the tooth ratio of the planetary gear set 540; and the R4/S4 value is the tooth ratio of the planetary gear set 550.

A powertrain 610, shown in FIG. 7a, has the engine and torque converter 12, a planetary transmission 614, and the final drive mechanism 16. The planetary transmission 614 includes the input shaft 17, a planetary gear arrangement 618, and the output shaft 19. The planetary gear arrangement 618 includes four planetary gear sets 620, 630, 640 and 650.

The planetary gear set 620 includes a sun gear member 622, a ring gear member 624, and a planet carrier assembly member 626. The planet carrier assembly member 626 includes a plurality of intermeshing pinion gears 627, 628 rotatably mounted on a carrier member 629 and disposed in meshing relationship with the ring gear member 624 and the sun gear member 622, respectively.

The planetary gear set 630 includes a sun gear member 632, a ring gear member 634, and a planet carrier assembly member 636. The planet carrier assembly member 636 includes a plurality of pinion gears 637 rotatably mounted on a carrier member 639 and disposed in meshing relationship with both the sun gear member 632 and the ring gear member 634.

The planetary gear set 640 includes a sun gear member 642, a ring gear member 644, and a planet carrier assembly member 646. The planet carrier assembly member 646 includes a plurality of pinion gears 647 rotatably mounted on a carrier member 649 and disposed in meshing relationship with both the sun gear member 642 and the ring gear member 644.

The planetary gear set 650 includes a sun gear member 652, a ring gear member 654, and a planet carrier assembly member 656. The planet carrier assembly member 656 includes a plurality of pinion gears 657 rotatably mounted on a carrier member 659 and disposed in meshing relationship with both the sun gear member 652 and the ring gear member 654.

As a result of the dual clutch arrangement of the invention, the four planetary gear sets 620, 630, 640 and 650 are divided into first and second transmission subsets 660, 661 which are alternatively engaged to provide odd number and even number speed ranges, respectively. Transmission subset 660 includes planetary gear sets 620 and 630, and transmission subset 661 includes planetary gear sets 640 and 650. The output shaft 19 is continuously connected with members of both subsets 660 and 661.

As mentioned above, the first and second input clutches 662, 663 are alternatively engaged for transmitting power from the input shaft 17 to transmission subset 660 or transmission subset 661. The first and second input clutches 662, 663 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 660, 661 prior to engaging the respective input clutches 662, 663. The preselection is achieved by means of electronically controlled synchronizers. As shown, the planetary gear arrangement includes eight torque transmitting mechanisms 664, 665, 666, 667, 668, 669, 670 and 671. The torque transmitting mechanisms 664, 665, 668 and 669 comprise braking synchronizers, and the torque transmitting mechanisms 666, 667, 670 and 671 comprise rotating synchronizers.

Accordingly, the input shaft 17 is alternately connected with the first and second transmission subsets 660, 661 (i.e. through the clutch 662 to the sun gear member 632 and through the clutch 663 to the sun gear member 642). The sun gear member 622 is continuously connected with the planet carrier assembly member 636 through the interconnecting member 672. The ring gear member 624 is continuously connected with the planet carrier assembly member 646, the ring gear member 654 and the output shaft 19 through the interconnecting member 674.

The sun gear member 632 is selectively connectable with the input shaft 17 through the input clutch 662. The sun gear member 642 is selectively connectable with the input shaft 17 through the input clutch 663. The sun gear member 622 is selectively connectable with the transmission housing 680 through the braking synchronizer 664. The planet carrier assembly member 626 is selectively connectable with the transmission housing 680 through the braking synchronizer 665. The planet carrier assembly member 626 is selectively connectable with the ring gear member 634 through the synchronizer 666. The ring gear member 634 is selectively connectable with the sun gear member 632 through the synchronizer 667. The planet carrier assembly member 656 is selectively connectable with the transmission housing 680 through the braking synchronizer 668. The sun gear member 652 is selectively connectable with the transmission housing 680 through the braking synchronizer 669. The ring gear member 644 is selectively connectable with the planet carrier assembly member 656 through the synchronizer 670. The ring gear member 644 is selectively connectable with the sun gear member 652 through the synchronizer 671.

As shown in FIG. 7b, and in particular the truth table disclosed therein, the input clutches and torque transmitting mechanisms are selectively engaged in combinations of three to provide six forward speed ratios and a reverse speed ratio. The ratio values given are by way example and are established utilizing the ring gear/sun gear tooth ratios given in FIG. 7b. For example, the R1/S2 value is the tooth ratio of the planetary gear set 620; the R2/S2 value is the tooth ratio of the planetary gear set 630; the R3/S3 value is the tooth ratio of the planetary gear set 640; and the R4/S4 value is the tooth ratio of the planetary gear set 650. The ratio steps between adjacent forward ratios and the reverse to first ratio are also given in FIG. 7b.

Those skilled in the art will, upon reviewing the truth table of FIG. 7b, recognize that the numerical values of the reverse and second forward speed ratios are determined utilizing the ring gear/sun gear tooth ratios of the planetary gear sets 620, 630. The numerical values of the first and fifth forward speed ratios are determined utilizing the ring gear/ sun gear tooth ratios of the planetary gear sets 640, 650. The numerical value of the third forward speed ratio is determined utilizing the ring gear/sun gear tooth ratio of the planetary gear set 640. The numerical value of the fourth forward speed ratio is determined utilizing the ring gear/sun gear tooth ratio of the planetary gear set 620. The numerical value of the sixth forward speed ratio is 1.

Figures 8A, 8B:
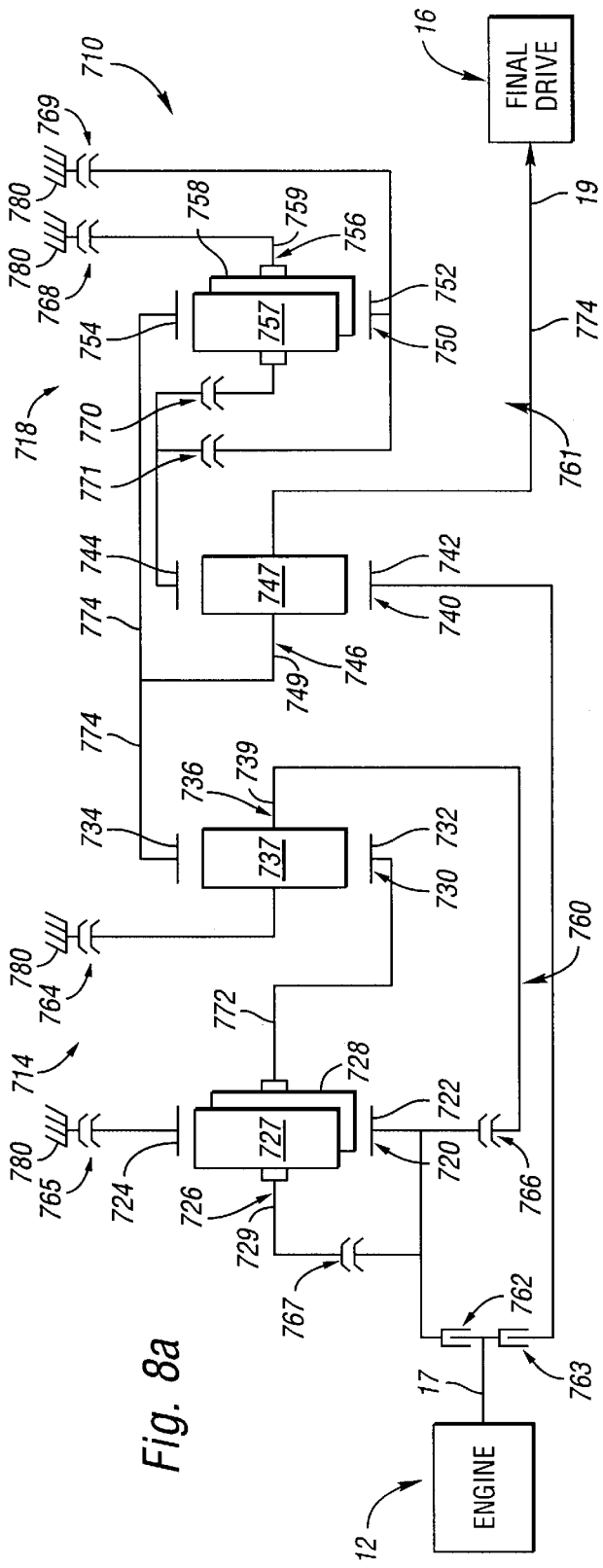

A powertrain 710, shown in FIG. 8a, has the conventional engine 12, a planetary transmission 714, and the conventional final drive mechanism 16. The engine 12 is continuously connected with the input shaft 17. The planetary transmission 714 is drivingly connected with the final drive mechanism 16 through the output shaft 19. The planetary transmission 714 includes a planetary gear arrangement 718 that has a first planetary gear set 720, a second planetary gear set 730, a third planetary gear set 740, and a fourth planetary gear set 750.

The planetary gear set 720 includes a sun gear member 722, a ring gear member 724, and a planet carrier assembly member 726. The planet carrier assembly member 726 includes a plurality of intermeshing pinion gears 727, 728 rotatably mounted on a carrier member 729 and disposed in meshing relationship with the ring gear member 724 and the sun gear member 722, respectively.

The planetary gear set 730 includes a sun gear member 732, a ring gear member 734, and a planet carrier assembly member 736. The planet carrier assembly member 736 includes a plurality of pinion gears 737 rotatably mounted on a carrier member 739 and disposed in meshing relationship with both the sun gear member 732 and the ring gear member 734.

The planetary gear set 740 includes a sun gear member 742, a ring gear member 744, and a planet carrier assembly member 746. The planet carrier assembly member 746 includes a plurality of pinion gears 747 rotatably mounted on a carrier member 749 and disposed in meshing relationship with both the sun gear member 742 and the ring gear member 744.

The planetary gear set 750 includes a sun gear member 752, a ring gear member 754, and a planet carrier assembly member 756. The planet carrier assembly member 756 includes a plurality of intermeshing pinion gears 757, 758 rotatably mounted on a carrier member 759 and disposed in meshing relationship with the ring gear member 754 and the sun gear member 752, respectively.

As a result of the dual clutch arrangement of the invention, the four planetary gear sets 720, 730, 740 and 750 are divided into first and second transmission subsets 760, 761 which are alternatively engaged to provide odd number and even number speed ranges, respectively. Transmission subset 760 includes planetary gear sets 720 and 730, and transmission subset 761 includes planetary gear sets 740 and 750. The output shaft 19 is continuously connected with members of both subsets 760 and 761.

As mentioned above, the first and second input clutches 762, 763 are alternatively engaged for transmitting power from the input shaft 17 to transmission subset 760 or transmission subset 761. The first and second input clutches 762, 763 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 760, 761 prior to engaging the respective input clutches 762, 763. The preselection is achieved by means of electronically controlled synchronizers. As shown, the planetary gear arrangement includes eight torque transmitting mechanisms 764, 765, 766, 767, 768, 769, 770 and 771. The torque transmitting mechanisms 764, 765, 768 and 769 comprise braking synchronizers, and the torque transmitting mechanisms 766, 767, 770 and 771 comprise rotating synchronizers.

Accordingly, the input shaft 17 is alternately connected with the first and second transmission subsets 760, 761 (i.e. through the clutch 762 to the sun gear member 722 and through the clutch 763 to the sun gear member 742). The planet carrier assembly member 726 is continuously connected with the sun gear member 732 through the interconnecting member 772. The ring gear member 734 is continuously connected with the planet carrier assembly member 746, the ring gear member 754 and the output shaft 19 through the interconnecting member 774.

The sun gear member 722 is selectively connectable with the input shaft 17 through the input clutch 762. The sun gear member 742 is selectively connectable with the input shaft 17 through the input clutch 763. The ring gear member 724 is selectively connectable with the transmission housing 780 through the braking synchronizer 764. The planet carrier assembly member 736 is selectively connectable with the transmission housing 780 through the braking synchronizer 765. The sun gear member 722 is selectively connectable with the planet carrier assembly member 736 through the synchronizer 766. The planet carrier assembly member 726 is selectively connectable with the sun gear member 722 through the synchronizer 767. The planet carrier assembly member 756 is selectively connectable with the transmission housing 780 through the braking synchronizer 768. The sun gear member 752 is selectively connectable with the transmission housing 780 through the braking synchronizer 769. The ring gear member 744 is selectively connectable with the planet carrier assembly member 756 through the synchronizer 770. The ring gear member 744 is selectively connectable with the sun gear member 752 through the synchronizer 771.

As shown in FIG. 8b, and in particular the truth table disclosed therein, the input clutches and torque transmitting mechanisms are selectively engaged in combinations of three to provide six forward speed ratios and a reverse speed ratio. Also given in the truth table is a set of numerical values that are attainable with the present invention utilizing the ring gear/sun gear tooth ratios given in FIG. 8b. The R1/S1 value is the tooth ratio of the planetary gear set 720; the R2/S2 value is the tooth ratio of the planetary gear set 730; the R3/S3 value is the tooth ratio of the planetary gear set 740; and the R4/S4 value is the tooth ratio of the planetary gear set 750.

FIG. 8b also provides a chart of the ratio steps between adjacent forward ratios and between the reverse and first forward ratio. For example, the ratio step between the first and second forward ratios is 1.78.

Those skilled in the art will recognize that the numerical value of the reverse speed ratio is determined utilizing the ring gear/sun gear tooth ratio of the planetary gear set 730. The numerical values of the first and fifth forward speed ratios are determined utilizing the ring gear/sun gear tooth ratios of the planetary gear sets 720, 730. The numerical value of the second forward speed ratio is determined utilizing the ring gear/sun gear tooth ratio of the planetary gear set 740. The numerical value of the third forward speed ratio is 1. The numerical values of the fourth and sixth forward speed ratios are determined utilizing the ring gear/sun gear tooth ratios of the planetary gear sets 740, 750.

A powertrain 810, shown in FIG. 9a, has the conventional engine 12, a planetary transmission 814, and the final drive mechanism 16. The engine 12 is continuously connected with the input shaft 17. The planetary transmission 814 is drivingly connected with final drive mechanism 16 through output shaft 19. The planetary transmission 814 includes a planetary gear arrangement 818 that has a first planetary gear set 820, a second planetary gear set 830, a third planetary gear set 840, and fourth planetary gear set 850.

The planetary gear set 820 includes a sun gear member 822, a ring gear member 824, and a planet carrier assembly member 826. The planet carrier assembly member 826 includes a plurality of intermeshing pinion gears 827, 828 rotatably mounted on a carrier member 829 and disposed in meshing relationship with the ring gear member 824 and the sun gear member 822, respectively.

The planetary gear set 830 includes a sun gear member 832, a ring gear member 834, and a planet carrier assembly member 836. The planet carrier assembly member 836 includes a plurality of intermeshing pinion gears 837, 838 rotatably mounted on a carrier member 839 and disposed in meshing relationship with the ring gear member 834 and the sun gear member 832, respectively.

The planetary gear set 840 includes a sun gear member 842, a ring gear member 844, and a planet carrier assembly member 846. The planet carrier assembly member 846 includes a plurality of pinion gears 847 rotatably mounted on a carrier member 849 and disposed in meshing relationship with both the sun gear member 842 and the ring gear member 844.

The planetary gear set 850 includes a sun gear member 852, a ring gear member 854, and a planet carrier assembly member 856. The planet carrier assembly member 856 includes a plurality of pinion gears 857 rotatably mounted on a carrier member 859 and disposed in meshing relationship with both the sun gear member 852 and the ring gear member 854.

As a result of the dual clutch arrangement of the invention, the four planetary gear sets 820, 830, 840 and 850 are divided into first and second transmission subsets 860, 861 which are alternatively engaged to provide odd number and even number speed ranges, respectively. Transmission subset 860 includes planetary gear sets 820 and 830, and transmission subset 861 includes planetary gear sets 840 and 850. The output shaft 19 is continuously connected with members of both subsets 860 and 861.

As mentioned above, the first and second input clutches 862, 863 are alternatively engaged for transmitting power from the input shaft 17 to transmission subset 860 or transmission subset 861. The first and second input clutches 862, 863 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratio selection is preselected within the transmission subsets 860, 861 prior to engaging the respective input clutches 862, 863. The preselection is achieved by means of electronically controlled synchronizers. As shown, the planetary gear arrangement includes eight torque transmitting mechanisms 864, 865, 866, 867, 868, 869, 870 and 871. The torque transmitting mechanisms 864, 865, 868 and 869 comprise braking synchronizers, and the torque transmitting mechanisms 866, 867, 870 and 871 comprise rotating synchronizers.

Accordingly, the input shaft 17 is alternately connected with the first and second transmission subsets 860, 861 (i.e.

through the clutch 862 to the sun gear member 822 and through the clutch 863 to the sun gear member 842). The planet carrier assembly member 826 is continuously connected with the sun gear member 832 through the interconnecting member 872. The ring gear member 834 is continuously connected with the planet carrier assembly member 846, the ring gear member 854 and the output shaft 19 through the interconnecting member 874.

The sun gear member 822 is selectively connectable with the input shaft 17 through the input clutch 862. The sun gear member 842 is selectively connectable with the input shaft 17 through the input clutch 863. The planet carrier assembly member 826 is selectively connectable with the transmission housing 880 through the braking synchronizer 864. The planet carrier assembly member 836 is selectively connectable with the transmission housing 880 through the braking synchronizer 865. The ring gear member 824 is selectively connectable with the planet carrier assembly member 836 through the synchronizer 866. The sun gear member 822 is selectively connectable with the planet carrier assembly member 836 through the synchronizer 867. The planet carrier assembly member 856 is selectively connectable with the transmission housing 880 through the braking synchronizer 868. The sun gear member 852 is selectively connectable with the transmission housing 880 through the braking synchronizer 869. The ring gear member 844 is selectively connectable with the planet carrier assembly member 856 through the synchronizer 870. The ring gear member 844 is selectively connectable with the sun gear member 852 through the synchronizer 871.

As shown in FIG. 9b, and in particular the truth table disclosed therein, the input clutches and torque transmitting mechanisms are selectively engaged in combinations of three to provide six forward speed ratios and a reverse speed ratio. A sample of numerical values for the individual ratios is also given in the truth table of FIG. 9b. These numerical values have been calculated using the ring gear/sun gear tooth ratios also given by way of example in FIG. 9b. The R1/S1 value is the tooth ratio of the planetary gear set 820; the R2/S2 value is the tooth ratio of planetary gear set 830; the R3/S3 value is the tooth ratio of the planetary gear set 840; and the R4/S4 value is the tooth ratio of the planetary gear set 850. FIG. 9b also describes the ratio steps between adjacent forward ratios and between the reverse and first forward ratio. For example, the ratio step between the first and second forward ratios is 1.60.

Those skilled in the art of planetary transmissions will recognize that the numerical values of the reverse and second forward speed ratios are determined utilizing the ring gear/sun gear tooth ratios of the planetary gear sets 820, 830. The numerical values of the first and fifth forward speed ratios are determined utilizing the ring gear/sun gear tooth ratios of the planetary gear sets 840, 850. The numerical value of the third forward speed ratio is determined utilizing the ring gear/sun gear tooth ratio of the planetary gear set 840. The numerical value of the fourth forward speed ratio is determined utilizing the ring gear/sun gear tooth ratio of the planetary gear set 830. The numerical value of the sixth forward speed ratio is 1.

Referring to FIG. 10a, a powertrain 910 is shown having a conventional engine 12, a planetary transmission 914, and a conventional final drive mechanism 16. The planetary transmission 914 includes an input shaft 17 connected with the engine 12, a planetary gear arrangement 918, and an output shaft 19 continuously connected with the final drive mechanism 16. The planetary gear arrangement 918 includes four planetary gear sets 920, 930, 940 and 950.

The planetary gear set 920 includes a sun gear member 922, a ring gear member 924, and a planet carrier assembly member 926. The planet carrier assembly member 926 includes a plurality of pinion gears 927 rotatably mounted on a carrier member 929 and disposed in meshing relationship with both the sun gear member 922 and the ring gear member 924.

The planetary gear set 930 includes a sun gear member 932, a ring gear member 934, and a planet carrier assembly member 936. The planet carrier assembly member 936 includes a plurality of intermeshing pinion gears 937, 938 rotatably mounted on a carrier member 939 and disposed in meshing relationship with the ring gear member 934 and the sun gear member 932, respectively.

The planetary gear set 940 includes a sun gear member 942, a ring gear member 944, and a planet carrier assembly member 946. The planet carrier assembly member 946 includes a plurality of pinion gears 947 rotatably mounted on a carrier member 949 and disposed in meshing relationship with both the sun gear member 942 and the ring gear member 944.

The planetary gear set 950 includes a sun gear member 952, a ring gear member 954, and a planet carrier assembly member 956. The planet carrier assembly member 956 includes a plurality of pinion gears 957 rotatably mounted on a carrier member 959 and disposed in meshing relationship with both the sun gear member 952 and the ring gear member 954.

As a result of the dual clutch arrangement of the invention, the four planetary gear sets 920, 930, 940 and 950 are divided into first and second transmission subsets 960, 961 which are alternatively engaged to provide odd number and even number speed ranges, respectively. Transmission subset 960 includes planetary gear sets 920 and 930, and transmission subset 961 includes planetary gear sets 940 and 950. The output shaft 19 is continuously connected with members of both subsets 960 and 961.

As mentioned above, the first and second input clutches 962, 963 are alternatively engaged for transmitting power from the input shaft 17 to transmission subset 960 or transmission subset 961. The first and second input clutches 962, 963 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 960, 961 prior to engaging the respective input clutches 962, 963. The preselection is achieved by means of electronically controlled synchronizers. As shown, the planetary gear arrangement includes eight torque transmitting mechanisms 964, 965, 966, 967, 968, 969, 970 and 971. The torque transmitting mechanisms 964, 965, 968 and 969 comprise braking synchronizers, and the torque transmitting mechanisms 966, 967, 970 and 971 comprise rotating synchronizers.

Accordingly, the input shaft 17 is alternately connected with the first and second transmission subsets 960, 961 (i.e. through the clutch 962 to the sun gear member 922 and through the clutch 963 to the sun gear member 942). The ring gear member 924 is continuously connected with the sun gear member 932 through the interconnecting member 972. The ring gear member 934 is continuously connected with the planet carrier assembly member 946, the ring gear member 954 and the output shaft 19 through the interconnecting member 974.

The sun gear member 922 is selectively connectable with the input shaft 17 through the input clutch 962. The sun gear member 942 is selectively connectable with the input shaft 17 through the input clutch 963. The ring gear member 924 is selectively connectable with the transmission housing 980 through the braking synchronizer 964. The planet carrier assembly member 926 is selectively connectable with the transmission housing 980 through the braking synchronizer 965. The planet carrier assembly member 926 is selectively connectable with the planet carrier assembly member 936 through the synchronizer 966. The sun gear member 922 is selectively connectable with the planet carrier assembly member 936 through the synchronizer 967. The planet carrier assembly member 956 is selectively connectable with the transmission housing 980 through the braking synchronizer 968. The sun gear member 952 is selectively connectable with the transmission housing 980 through the braking synchronizer 969. The ring gear member 944 is selectively connectable with the planet carrier assembly member 956 through the synchronizer 970. The ring gear member 944 is selectively connectable with the sun gear member 952 through the synchronizer 971.

As shown in FIG. 10b, and in particular the truth table disclosed therein, the input clutches and torque transmitting mechanisms are selectively engaged in combinations of three to provide seven forward speed ratios and a reverse speed ratio. The truth table also provides a set of examples for the numerical values for each of the reverse and forward speed ratios. These numerical values have been determined utilizing the ring gear/sun gear tooth ratios given in FIG. 10b. The R1/S1 value is the tooth ratio of the planetary gear set 920; the R2/S2 value is the tooth ratio of the planetary gear set 930; the R3/S3 value is the tooth ratio of the planetary gear set 940; and the R4/S4 value is the tooth ratio of the planetary gear set 950.

Those skilled in the art, upon reviewing the engagement combinations, will recognize that the numerical values of the reverse, first and third forward speed ratios are determined utilizing the ring gear/sun gear tooth ratios of the planetary gear sets 920, 930. The numerical values of the second and sixth forward speed ratios are determined utilizing the ring gear/sun gear tooth ratios of the planetary gear sets 940, 950. The numerical value of the fourth forward speed ratio is determined utilizing the ring gear/sun gear tooth ratio of the planetary gear set 940. The numerical value of the fifth forward speed ratio is determined utilizing the ring gear/sun gear tooth ratio of the planetary gear set 930. The numerical value of the seventh forward speed ratio is 1.

Referring to FIG. 11a, a powertrain 1010 is shown having a conventional engine 12, a planetary transmission 1014, and a conventional final drive mechanism 16. The planetary transmission 1014 includes an input shaft 17 connected with the engine 12, a planetary gear arrangement 1018, and an output shaft 19 continuously connected with the final drive mechanism 16. The planetary gear arrangement 1018 includes four planetary gear sets 1020, 1030, 1040 and 1050.

The planetary gear set 1020 includes a sun gear member 1022, a ring gear member 1024, and a planet carrier assembly member 1026. The planet carrier assembly member 1026 includes a plurality of pinion gears 1027 rotatably mounted on a carrier member 1029 and disposed in meshing relationship with both the sun gear member 1022 and the ring gear member 1024.

The planetary gear set 1030 includes a sun gear member 1032, a ring gear member 1034, and a planet carrier assembly member 1036. The planet carrier assembly member 1036 includes a plurality of intermeshing pinion gears 1037, 1038 rotatably mounted on a carrier member 1039 and disposed in meshing relationship with the ring gear member 1034 and the sun gear member 1032, respectively.

The planetary gear set 1040 includes a sun gear member 1042, a ring gear member 1044, and a planet carrier assembly member 1046. The planet carrier assembly member 1046 includes a plurality of pinion gears 1047 rotatably mounted on a carrier member 1049 and disposed in meshing relationship with both the sun gear member 1042 and the ring gear member 1044.

The planetary gear set 1050 includes a sun gear member 1052, a ring gear member 1054, and a planet carrier assembly member 1056. The planet carrier assembly member 1056 includes a plurality of intermeshing pinion gears 1057, 1058 rotatably mounted on a carrier member 1059 and disposed in meshing relationship with the ring gear member 1054 and the sun gear member 1052, respectively.

As a result of the dual clutch arrangement of the invention, the four planetary gear sets 1020, 1030, 1040 and 1050 are divided into first and second transmission subsets 1060, 1061 which are alternatively engaged to provide odd number and even number speed ranges, respectively. Transmission subset 1060 includes planetary gear sets 1020 and 1030, and transmission subset 1061 includes planetary gear sets 1040 and 1050. The output shaft 19 is continuously connected with members of both subsets 1060 and 1061.

As mentioned above, the first and second input clutches 1062, 1063 are alternatively engaged for transmitting power from the input shaft 17 to transmission subset 1060 or transmission subset 1061. The first and second input clutches 1062, 1063 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 1060, 1061 prior to engaging the respective input clutches 1062, 1063. The preselection is achieved by means of electronically controlled synchronizers. As shown, the planetary gear arrangement includes eight torque transmitting mechanisms 1064, 1065, 1066, 1067, 1068, 1069, 1070 and 1071. The torque transmitting mechanisms 1064, 1065, 1068 and 1069 comprise braking synchronizers, and the torque transmitting mechanisms 1066, 1067, 1070 and 1071 comprise rotating synchronizers.

Accordingly, the input shaft 17 is alternately connected with the first and second transmission subsets 1060, 1061 (i.e. through the clutch 1062 to the sun gear member 1022 and through the clutch 1063 to the sun gear member 1042). The ring gear member 1024 is continuously connected with the sun gear member 1032 through the interconnecting member 1072. The planet carrier assembly member 1046 is continuously connected with the ring gear member 1034, the sun gear member 1052 and the output shaft 19 through the interconnecting member 1074.

The sun gear member 1022 is selectively connectable with the input shaft 17 through the input clutch 1062. The sun gear member 1042 is selectively connectable with the input shaft 17 through the input clutch 1063. The ring gear member 1024 is selectively connectable with the transmission housing 1080 through the braking synchronizer 1064.

The planet carrier assembly member 1026 is selectively connectable with the transmission housing 1080 through the braking synchronizer 1065. The planet carrier assembly member 1026 is selectively connectable with the planet carrier assembly member 1036 through the synchronizer 1066. The sun gear member 1022 is selectively connectable with the planet carrier assembly member 1036 through the synchronizer 1067. The ring gear member 1054 is selectively connectable with the transmission housing 1080 through the braking synchronizer 1068. The planet carrier assembly member 1056 is selectively connectable with the transmission housing 1080 through the braking synchronizer 1069. The ring gear member 1044 is selectively connectable with the ring gear member 1054 through the synchronizer 1070. The ring gear member 1044 is selectively connectable with the planet carrier assembly member 1056 through the synchronizer 1071.

As shown in FIG. 11b, and in particular the truth table disclosed therein, the input clutches and torque transmitting mechanisms are selectively engaged in combinations of three to provide seven forward speed ratios and a reverse speed ratio. The truth table also provides a set of examples for the numerical values for each of the reverse and forward speed ratios. These numerical values have been determined utilizing the ring gear/sun gear tooth ratios given in FIG. 11b. The R1/S1 value is the tooth ratio of the planetary gear set 1020; the R2/S2 value is the tooth ratio of the planetary gear set 1030; the R3/S3 value is the tooth ratio of the planetary gear set 1040; and the R4/S4 value is the tooth ratio of the planetary gear set 1050.

Those skilled in the art, upon reviewing the engagement combinations, will recognize that the numerical values of the reverse, first and third forward speed ratios are determined utilizing the ring gear/sun gear tooth ratios of the planetary gear set 1020, 1030. The numerical values of the second and sixth forward speed ratios are determined utilizing the ring gear/sun gear tooth ratios of the planetary gear set 1040, 1050. The numerical value of the fourth forward speed ratio is determined utilizing the ring gear/sun gear tooth ratio of the planetary gear set 1040. The numerical value of the fifth forward speed ratio is determined utilizing the ring gear/sun gear tooth ratio of the planetary gear set 1030. The numerical value of the seventh forward speed ratio is 1.

Referring to FIG. 12a, a powertrain 1110 is shown having a conventional engine 12, a planetary transmission 1114, and a conventional final drive mechanism 16. The planetary transmission 1114 includes an input shaft 17 connected with the engine 12, a planetary gear arrangement 1118, and an output shaft 19 continuously connected with the final drive mechanism 16. The planetary gear arrangement 1118 includes four planetary gear sets 1120, 1130, 1140 and 1150.

The planetary gear set 1120 includes a sun gear member 1122, a ring gear member 1124, and a planet carrier assembly member 1126. The planet carrier assembly member 1126 includes a plurality of pinion gears 1127 rotatably mounted on a carrier member 1129 and disposed in meshing relationship with both the sun gear member 1122 and the ring gear member 1124.

The planetary gear set 1130 includes a sun gear member 1132, a ring gear member 1134, and a planet carrier assembly member 1136. The planet carrier assembly member 1136 includes a plurality of intermeshing pinion gears 1137, 1138 rotatably mounted on a carrier member 1139 and disposed in meshing relationship with the ring gear member 1134 and the sun gear member 1132, respectively.

The planetary gear set 1140 includes a sun gear member 1142, a ring gear member 1144, and a planet carrier assembly member 1146. The planet carrier assembly member 1146 includes a plurality of pinion gears 1147 rotatably mounted on a carrier member 1149 and disposed in meshing relationship with both the sun gear member 1142 and the ring gear member 1144.

The planetary gear set 1150 includes a sun gear member 1152, a ring gear member 1154, and a planet carrier assembly member 1156. The planet carrier assembly member 1156 includes a plurality of pinion gears 1157 rotatably mounted on a carrier member 1159 and disposed in meshing relationship with both the sun gear member 1152 and the ring gear member 1154.

As a result of the dual clutch arrangement of the invention, the four planetary gear sets 1120, 1130, 1140 and 1150 are divided into first and second transmission subsets 1160, 1161 which are alternatively engaged to provide odd number and even number speed ranges, respectively. Transmission subset 1160 includes planetary gear sets 1120 and 1130, and transmission subset 1161 includes planetary gear sets 1140 and 1150. The output shaft 19 is continuously connected with members of both subsets 1160 and 1161.

As mentioned above, the first and second input clutches 1162, 1163 are alternatively engaged for transmitting power from the input shaft 17 to transmission subset 1160 or transmission subset 1061. The first and second input clutches 1162, 1163 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 1160, 1161 prior to engaging the respective input clutches 1162, 1163. The preselection is achieved by means of electronically controlled synchronizers. As shown, the planetary gear arrangement includes eight torque transmitting mechanisms 1164, 1165, 1166, 1167, 1168, 1169, 1170 and 1171. The torque transmitting mechanisms 1164, 1165, 1168 and 1169 comprise braking synchronizers, and the torque transmitting mechanisms 1166, 1167, 1170 and 1171 comprise rotating synchronizers.

Accordingly, the input shaft 17 is alternately connected with the first and second transmission subsets 1160, 1161 (i.e. through the clutch 1162 to the sun gear member 1122 and through the clutch 1163 to the sun gear member 1142). The planet carrier assembly member 1126 is continuously connected with the sun gear member 1132 through the interconnecting member 1172. The planet carrier assembly member 1146 is continuously connected with the ring gear member 1134, the ring gear member 1154 and the output shaft 19 through the interconnecting member 1174.

The sun gear member 1122 is selectively connectable with the input shaft 17 through the input clutch 1162. The sun gear member 1142 is selectively connectable with the input shaft 17 through the input clutch 1163. The planet carrier assembly member 1126 is selectively connectable with the transmission housing 1180 through the braking synchronizer 1164. The ring gear member 1124 is selectively connectable with the transmission housing 1180 through the braking synchronizer 1165. The sun gear member 1122 is selectively connectable with the planet carrier assembly member 1136 through the synchronizer 1166. The ring gear member 1124 is selectively connectable with the planet carrier assembly member 1136 through the synchronizer 1167. The planet carrier assembly member 1156 is selectively connectable with the transmission housing 1180 through the braking synchronizer 1168. The sun gear member 1152 is selectively connectable with the transmission housing 1180 through the braking synchronizer 1169. The ring gear member 1144 is selectively connectable with the planet carrier assembly member 1156 through the synchronizer 1170. The ring gear member 1144 is selectively connectable with the sun gear member 1152 through the synchronizer 1171.

As shown in FIG. 12*b*, and in particular the truth table disclosed therein, the input clutches and torque transmitting mechanisms are selectively engaged in combinations of three to provide seven forward speed ratios and a reverse speed ratio. The truth table also provides a set of examples for the numerical values for each of the reverse and forward speed ratios. These numerical values have been determined utilizing the ring gear/sun gear tooth ratios given in FIG. 12*b*. The R1/S1 value is the tooth ratio of the planetary gear set 1120; the R2/S2 value is the tooth ratio of the planetary gear set 1130; the R3/S3 value is the tooth ratio of the planetary gear set 1140; and the R4/S4 value is the tooth ratio of the planetary gear set 1150.

Those skilled in the art, upon reviewing the engagement combinations, will recognize that the numerical values of the reverse, second and sixth forward speed ratios are determined utilizing the ring gear/sun gear tooth ratios of the planetary gear sets 1120, 1130. The numerical values of the first and fifth forward speed ratios are determined utilizing the ring gear/sun gear tooth ratios of the planetary gear sets 1140, 1150. The numerical value of the third forward speed ratio is determined utilizing the ring gear/sun gear tooth ratio of the planetary gear set 1140. The numerical value of the fourth forward speed ratio is determined utilizing the ring gear/sun gear tooth ratio of the planetary gear set 1130. The numerical value of the seventh forward speed ratio is 1.

Referring to FIG. 13*a*, a powertrain 1210 is shown having a conventional engine 12, a planetary transmission 1214, and a conventional final drive mechanism 16. The planetary transmission 1214 includes an input shaft 17 connected with the engine 12, a planetary gear arrangement 1218, and an output shaft 19 continuously connected with the final drive mechanism 16. The planetary gear arrangement 1218 includes four planetary gear sets 1220, 1230, 1240 and 1250.

The planetary gear set 1220 includes a sun gear member 1222, a ring gear member 1224, and a planet carrier assembly member 1226. The planet carrier assembly member 1226 includes a plurality of pinion gears 1227 rotatably mounted on a carrier member 1229 and disposed in meshing relationship with both the sun gear member 1222 and the ring gear member 1224.

The planetary gear set 1230 includes a sun gear member 1232, a ring gear member 1234, and a planet carrier assembly member 1236. The planet carrier assembly member 1236 includes a plurality of intermeshing pinion gears 1237, 1238 rotatably mounted on a carrier member 1239 and disposed in meshing relationship with the ring gear member 1234 and the sun gear member 1232, respectively.

The planetary gear set 1240 includes a sun gear member 1242, a ring gear member 1244, and a planet carrier assembly member 1246. The planet carrier assembly member 1246 includes a plurality of pinion gears 1247 rotatably mounted on a carrier member 1249 and disposed in meshing relationship with both the sun gear member 1242 and the ring gear member 1244.

The planetary gear set 1250 includes a sun gear member 1252, a ring gear member 1254, and a planet carrier assembly member 1256. The planet carrier assembly member 1256 includes a plurality of intermeshing pinion gears 1257, 1258 rotatably mounted on a carrier member 1259 and disposed in meshing relationship with the ring gear member 1254 and the sun gear member 1252, respectively.

As a result of the dual clutch arrangement of the invention, the four planetary gear sets 1220, 1230, 1240 and 1250 are divided into first and second transmission subsets 1260, 1261 which are alternatively engaged to provide odd number and even number speed ranges, respectively. Transmission subset 1260 includes planetary gear sets 1220 and 1230, and transmission subset 1261 includes planetary gear sets 1240 and 1250. The output shaft 19 is continuously connected with members of both subsets 1260 and 1261.

As mentioned above, the first and second input clutches 1262, 1263 are alternatively engaged for transmitting power from the input shaft 17 to transmission subset 1260 or transmission subset 1261. The first and second input clutches 1262, 1263 are controlled electronically and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 1260, 1261 prior to engaging the respective input clutches 1262, 1263. The preselection is achieved by means of electronically controlled synchronizers. As shown, the planetary gear arrangement includes eight torque transmitting mechanisms 1264, 1265, 1266, 1267, 1268, 1269, 1270 and 1271. The torque transmitting mechanisms 1264, 1265, 1268 and 1269 comprise braking synchronizers, and the torque transmitting mechanisms 1266, 1267, 1270 and 1271 comprise rotating synchronizers.

Accordingly, the input shaft 17 is alternately connected with the first and second transmission subsets 1260, 1261 (i.e. through the clutch 1262 to the sun gear member 1222 and through the clutch 1263 to the sun gear member 1242). The planet carrier assembly member 1226 is continuously connected with the sun gear member 1232 through the interconnecting member 1272. The planet carrier assembly member 1246 is continuously connected with the ring gear member 1234, the sun gear member 1252, and the output shaft 19 through the interconnecting member 1274.

The sun gear member 1222 is selectively connectable with the input shaft 17 through the input clutch 1262. The sun gear member 1242 is selectively connectable with the input shaft 17 through the input clutch 1263. The planet carrier assembly member 1226 is selectively connectable with the transmission housing 1280 through the braking synchronizer 1264. The ring gear member 1224 is selectively connectable with the transmission housing 1280 through the braking synchronizer 1265. The sun gear member 1222 is selectively connectable with the planet carrier assembly member 1236 through the synchronizer 1266. The ring gear member 1224 is selectively connectable with the planet carrier assembly member 1236 through the synchronizer 1267. The ring gear member 1254 is selectively connectable with the transmission housing 1280 through the braking synchronizer 1268. The planet carrier assembly member 1256 is selectively connectable with the transmission housing 1280 through the braking synchronizer 1269. The ring gear member 1244 is selectively connectable with the ring gear member 1254 through the synchronizer 1270. The ring gear member 1244 is selectively connectable with the planet carrier assembly member 1256 through the synchronizer 1271.

As shown in FIG. 13b, and in particular the truth table disclosed therein, the input clutches and torque transmitting mechanisms are selectively engaged in combinations of three to provide seven forward speed ratios and a reverse speed ratio. The truth table also provides a set of examples for the numerical values for each of the reverse and forward speed ratios. These numerical values have been determined utilizing the ring gear/sun gear tooth ratios given in FIG. 13b. The R1/S1 value is the tooth ratio of the planetary gear set 1220; the R2/S2 value is the tooth ratio of the planetary gear set 1230; the R3/S3 value is the tooth ratio of the planetary gear set 1240; and the R4/S4 value is the tooth ratio of the planetary gear set 1250.

Those skilled in the art, upon reviewing the engagement combinations, will recognize that the numerical values of the reverse, second and sixth forward speed ratios are determined utilizing the ring gear/sun gear tooth ratios of the planetary gear sets 1220, 1230. The numerical values of the first and fifth forward speed ratios are determined utilizing the ring gear/sun gear tooth ratios of the planetary gear sets 1240, 1250. The numerical value of the third forward speed ratio is determined utilizing the ring gear/sun gear tooth ratio of the planetary gear set 1240. The numerical value of the fourth forward speed ratio is determined utilizing the ring gear/sun gear tooth ratio of the planetary gear set 1230. The numerical value of the seventh forward speed ratio is 1.

Figures 14A, 14B:
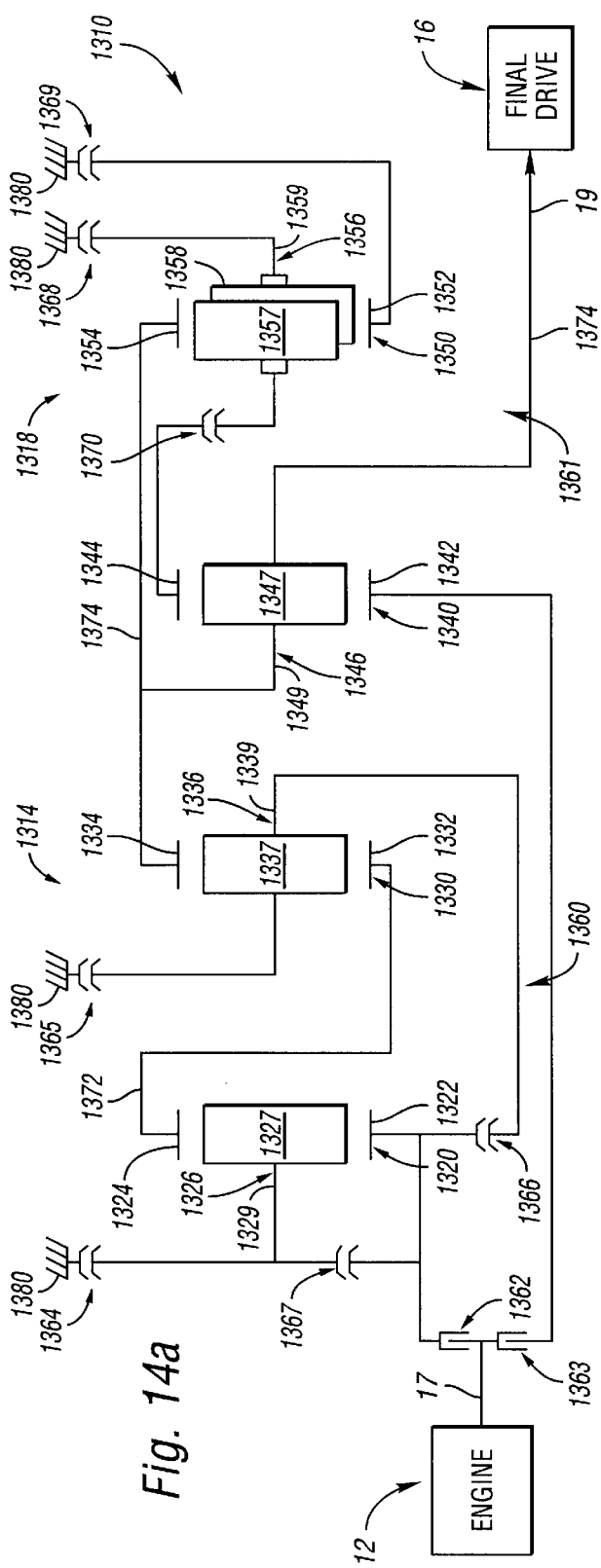

FIGS. 14a and 14b illustrate a transmission wherein one of the torque transmitting mechanisms from a previously described configuration is eliminated to realize five forward speed ratios and a reverse speed ratio. Specifically, the powertrain 1310, shown in FIG. 14a is identical to that shown in FIG. 5a, except that the synchronizer 471 of FIG. 5a has been eliminated.

The powertrain 1310, shown in FIG. 14a, includes the conventional engine 12, a planetary transmission 1314, and the conventional final drive mechanism 16. The engine 12 is selectively connectable with the planetary transmission 1314 through the input shaft 17. The planetary transmission is drivingly connected with the final drive mechanism 16 through the input shaft 17. The planetary transmission 1314 includes a planetary gear arrangement 1318 that has a first planetary gear set 1320, a second planetary gear set 1330, a third planetary gear set 1340, and a fourth planetary gear set 1350.

The planetary gear set 1320 includes a sun gear member 1322, a ring gear member 1324, and a planet carrier assembly member 1326. The planet carrier assembly member 1326 includes a plurality of pinion gears 1327 rotatably mounted on a carrier member 1329 and disposed in meshing relationship with both the sun gear member 1322 and the ring gear member 1324.

The planetary gear set 1330 includes a sun gear member 1332, a ring gear member 1334, and a planet carrier assembly member 1336. The planet carrier assembly member 1336 includes a plurality of pinion gears 1337 rotatably mounted on a carrier member 1339 and disposed in meshing relationship with both the sun gear member 1332 and the ring gear member 1334.

The planetary gear set 1340 includes a sun gear member 1342, a ring gear member 1344, and a planet carrier assembly member 1346. The planet carrier assembly member 1346 includes a plurality of pinion gears 1347 rotatably mounted on a carrier member 1349 and disposed in meshing relationship with both the sun gear member 1342 and the ring gear member 1344.

The planetary gear set 1350 includes a sun gear member 1352, a ring gear member 1354, and a planet carrier assembly member 1356. The planet carrier assembly member 1356 includes a plurality of intermeshing pinion gears 1357, 1358 rotatably mounted on a carrier member 1359 and disposed in meshing relationship with the ring gear member 1354 and the sun gear member 1352, respectively.

As a result of the dual clutch arrangement of the invention, the four planetary gear sets 1320, 1330, 1340 and 1350 are divided into first and second transmission subsets 1360, 1361 which are alternatively engaged to provide odd number and even number speed ranges, respectively. Transmission subset 1360 includes planetary gear sets 1320 and 1330, and transmission subset 1361 includes planetary gear sets 1340 and 1350. The output shaft 19 is continuously connected with members of both subsets 1360 and 1361.

As mentioned above, the first and second input clutches 1362, 1363 are alternatively engaged for transmitting power from the input shaft 17 to transmission subset 1360 or transmission subset 1361. The first and second input clutches 1362, 1363 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All speed ratios are preselected within the transmission subsets 1360, 1361 prior to engaging the respective input clutches 1362, 1363. The preselection is achieved by means of electronically controlled synchronizers. As shown, the planetary gear arrangement includes seven torque transmitting mechanisms 1364, 1365, 1366, 1367, 1368, 1369 and 1370. The torque transmitting mechanism 1364, 1365, 1368 and 1369 comprise braking synchronizers, and the torque transmitting mechanisms 1366, 1367 and 1370 comprise rotating synchronizers.

Accordingly, the input shaft 17 is alternately connected with the first and second transmission subsets 1360, 1361 (i.e. through the clutch 1362 to the sun gear member 1322 and through the clutch 1363 to the sun gear member 1342). The ring gear member 1324 is continuously connected with the sun gear member 1332 through the interconnecting member 1372. The planet carrier assembly member 1346 is continuously connected with the ring gear members 1334, 1354 and the output shaft 19 through the interconnecting member 1374.

The sun gear member 1322 is selectively connectable with the input shaft 17 through the input clutch 1362. The sun gear member 1342 is selectively connectable with the input shaft 17 through the input clutch 1363. The planet carrier assembly member 1326 is selectively connectable with the transmission housing 1380 through the braking synchronizer 1364. The planet carrier assembly member 1336 is selectively connectable with the transmission housing 1380 through the braking synchronizer 1365. The sun gear member 1322 is selectively connectable with the planet carrier assembly member 1336 through the synchronizer 1366. The planet carrier assembly member 1326 is selectively connectable with the sun gear member 1322 through the synchronizer 1367. The planet carrier assembly member 1356 is selectively connectable with the transmission housing 1380 through the braking synchronizer 1368. The sun gear member 1352 is selectively connectable with the transmission housing 1380 through the braking synchronizer 1369. The ring gear member 1344 is selectively connectable with the planet carrier assembly member 1356 through the synchronizer 1370.

As shown in FIG. 13*b*, and in particular the truth table disclosed therein, the input clutches and torque transmitting mechanisms are selectively engaged in combinations of three to provide five forward speed ratios and a reverse speed ratio. A sample of the numerical values for the ratios is also provided in the truth table of the FIG. 13*b*. These values are determined utilizing the ring gear/sun gear tooth ratios also given in FIG. 13*b*. The R1/S1 value is the tooth ratio of the planetary gear set 1320; the R2/S2 value is the tooth ratio of the planetary gear set 1330; the R3/S3 value is the tooth ratio of the planetary gear set 1340; and the R4/S4 value is the tooth ratio of the planetary gear set 1350. Also given in FIG. 13*b* is a chart describing the step ratios between the adjacent forward speed ratios and the reverse to first forward speed ratio.

Those skilled in the art will recognize that the numerical value of the reverse speed ratio is determined utilizing the ring gear/sun gear tooth ratio of the planetary gear set 1330. The numerical values of the first and fifth forward speed ratios are determined utilizing the ring gear/sun gear tooth ratios of the planetary gear sets 1320, 1330. The numerical value of the second forward speed ratio is determined utilizing the ring gear/sun gear tooth ratio of the planetary gear set 1340. The numerical value of the third forward speed ratio is 1. The numerical value of the fourth forward speed ratio is determined utilizing the ring gear/sun gear tooth ratios of the planetary gear sets 1340, 1350.

While the best modes for carrying out the invention have been described in detail, those familiar with the art to which this invention relates will recognize various alternative designs and embodiments for practicing the invention within the scope of the appended claims.

What is claimed is:

1. A multi-speed transmission comprising:
    an input shaft;
    an output shaft;
    first, second, third and fourth planetary gear sets each having first, second and third members;
    a first interconnecting member continuously interconnecting said first member of said first planetary gear set with said first member of said second planetary gear set;
    a second interconnecting member continuously interconnecting said second member of said second planetary gear set with said first member of said third planetary gear set, said first member of said fourth planetary gear set and said output shift;
    a first input clutch selectively interconnecting said input shaft with said second member of said first planetary gear set;
    a second input clutch selectively interconnecting said input shaft with said second member of said third planetary gear set;
    a first torque-transmitting mechanism selectively interconnecting said third member of said second planetary gear set with a member of said first planetary gear set;
    a second torque-transmitting mechanism selectively interconnecting said second member of said first planetary gear set with another member of said first or second planetary gear set;
    a third torque-transmitting mechanism selectively interconnecting said third member of said third planetary gear set with said second member of said fourth planetary gear set;
    a fourth torque-transmitting mechanism selectively interconnecting said third member of said third planetary gear set with said third member of said fourth planetary gear set;
    a fifth torque-transmitting mechanism selectively interconnecting said first or third members of said first planetary gear set with a stationary member;
    a sixth torque-transmitting mechanism selectively interconnecting said third member of said first or second planetary gear set with said stationary member, said member interconnected with said stationary member by said sixth torque-transmitting mechanism being different from said member interconnected with said stationary member by said fifth torque-transmitting mechanism;
    a seventh torque-transmitting mechanism selectively interconnecting said second member of said fourth planetary gear set with said stationary member;
    an eighth torque-transmitting mechanism selectively interconnecting said third member of said fourth planetary gear set with said stationary member;
    said input clutches and torque-transmitting mechanisms being engaged in combinations of at least three to provide at least six forward speed ratios and a reverse speed ratio.

2. The transmission defined in claim 1, wherein said eight torque-transmitting mechanisms comprise synchronizers.

3. The transmission defined in claim 1, wherein said fifth, sixth, seventh and eighth torque-transmitting mechanisms comprise braking synchronizers, and said first, second, third and fourth torque-transmitting mechanisms comprise rotating synchronizers.

4. The transmission defined in claim 1, wherein said first input clutch is applied for odd number speed ranges and said second input clutch is applied for even number speed ranges.

5. The transmission defined in claim 1, wherein said first input clutch is applied for even number speed ranges and said second input clutch is applied for odd number speed ranges.

6. The transmission defined in claim 1, wherein said first input clutch and said second input clutch are interchangeable to shift from odd number speed ranges to even number speed ranges, and vice versa.

7. The transmission defined in claim 1, wherein selected ones of said eight torque-transmitting mechanisms are engaged prior to gear shifting to achieve shifting without torque interruptions.

8. The transmission defined in claim 2, wherein at least two of said synchronizers comprise a double synchronizer to reduce cost and package size.

9. A multi-speed transmission comprising:
    an input shaft;
    an output shaft;
    first, second, third and fourth planetary gear sets each having first, second and third members;
    a first interconnecting member continuously interconnecting said first member of said first planetary gear set with said first member of said second planetary gear set;
    a second interconnecting member continuously interconnecting said second member of said second planetary gear set with said first member of said third planetary gear set, said first member of said fourth planetary gear set and said output shaft;

a first input clutch selectively interconnecting said input shaft with said second member of said first planetary gear set;

a second input clutch selectively interconnecting said input shaft with said second member of said third planetary gear set; and eight torque-transmitting mechanisms for selectively interconnecting said members of said first, second, third or fourth planetary gear sets with said first or second input clutch, with a stationary member or in pairs for common rotation, said eight torque-transmitting mechanisms and two input clutches being engaged in combinations of at least three to establish at least six forward speed ratios and a reverse speed ratio between said input shaft and said output shaft.

10. The transmission defined in claim 9, wherein the first of said eight torque-transmitting mechanisms is operable for selectively interconnecting said third member of said second planetary gear set with a member of said first planetary gear set, and the second of said eight torque-transmitting mechanisms is operable for selectively interconnecting said second member of said first planetary gear set with another member of said first or second planetary gear sets, or with said first input clutch.

11. The transmission defined in claim 9, wherein the third of said eight torque-transmitting mechanisms is operable for selectively interconnecting said third member of said third planetary gear set with said second member of said fourth planetary gear set, and the fourth of said eight torque-transmitting mechanisms is operable for selectively interconnecting said third member of said third planetary gear set with said third member of said fourth planetary gear set.

12. The transmission defined in claim 9, wherein the fifth of said eight torque-transmitting mechanisms is operable for selectively interconnecting said first or third member of said first planetary gear set with said stationary member, and the sixth of said eight torque-transmitting mechanisms is operable for selectively interconnecting said third member of said first or second planetary gear set with said stationary member, said member interconnected with said stationary member by said sixth torque-transmitting mechanism being different from said member interconnected with said stationary member by said fifth torque-transmitting mechanism.

13. The transmission defined in claim 9, wherein the seventh of said eight torque-transmitting mechanisms is operable for selectively interconnecting said second member of said fourth planetary gear set with said stationary member, and the eighth of said eight torque-transmitting mechanisms is operable for selectively interconnecting said third member of said fourth planetary gear set with said stationary member.

14. The transmission defined in claim 9, wherein planet carrier assembly members of a plurality of said planetary gear sets are single pinion carriers.

15. The transmission defined in claim 9, wherein planet carrier assembly members of a plurality of said planetary gear sets are double pinion carriers.

16. The transmission defined in claim 9, wherein each of said eight torque-transmitting mechanisms comprises a synchronizer.

17. The transmission defined in claim 9, wherein said first input clutch is applied for odd number speed ranges and said second input clutch is applied for even number speed ranges.

18. The transmission defined in claim 9, wherein said first input clutch is applied for even number speed ranges and said second input clutch is applied for odd number speed ranges.

19. The transmission defined in claim 9, wherein selected ones of said eight torque-transmitting mechanisms are engaged prior to gear shifting to achieve shifting without torque interruptions.

20. A multi-speed transmission comprising:

an input shaft;

an output shaft;

first, second, third and fourth planetary gear sets each having first, second and third members;

a first interconnecting member continuously interconnecting said first member of said first planetary gear set with said first member of said second planetary gear set;

a second interconnecting member continuously interconnecting said second member of said second planetary gear set with said first member of said third planetary gear set, said first member of said fourth planetary gear set and said output shaft;

a first input clutch selectively interconnecting said input shaft with said second member of said first planetary gear set;

a second input clutch selectively interconnecting said input shaft with said second member of said third planetary gear set; and seven torque-transmitting mechanisms for selectively interconnecting said members of said first, second, third or fourth planetary gear sets with said first or second input clutch, with a stationary member or in pairs for common rotation, said seven torque-transmitting mechanisms and two input clutches being engaged in combinations of at least three to establish at least five forward speed ratios and a reverse speed ratio between said input shaft and said output shaft.

21. The transmission defined in claim 20, wherein the first of said eight torque-transmitting mechanisms is operable for selectively interconnecting said third member of said second planetary gear set with a member of said first planetary gear set, and the second of said seven torque-transmitting mechanisms is operable for selectively interconnecting said second member of said first planetary gear set with another member of said first or second planetary gear set, or with said first input clutch.

22. The transmission defined in claim 20, wherein the third of said seven torque-transmitting mechanisms is operable for selectively interconnecting said third member of said third planetary gear set with said second member of said fourth planetary gear set.

23. The transmission defined in claim 20, wherein the fourth of said eight torque-transmitting mechanisms is operable for selectively interconnecting said first or third member of said first planetary gear set with said stationary member, and the fifth of said seven torque-transmitting mechanisms is operable for selectively interconnecting said third member of said first or second planetary gear set with said stationary member, said member interconnected with said stationary member by said fifth torque-transmitting mechanism being different from said member interconnected with said stationary member by said fourth torque-transmitting mechanism.

24. The transmission defined in claim 20, wherein the sixth of said eight torque-transmitting mechanisms is operable for selectively interconnecting said second member of said fourth planetary gear set with said stationary member, and the seventh of said seven torque-transmitting mechanisms is operable for selectively interconnecting said third member of said fourth planetary gear set with said stationary member.

25. The transmission defined in claim 20, wherein planet carrier assembly members of a plurality of said planetary gear sets are single pinion carriers.

26. The transmission defined in claim 20, wherein planet carrier assembly members of a plurality of said planetary gear sets are double pinion carriers.

27. The transmission defined in claim 20, wherein each of said seven torque-transmitting mechanisms comprises a synchronizer.

28. The transmission defined in claim 20, wherein said first input clutch is applied for odd number speed ranges and said second input clutch is applied for even number speed ranges.

29. The transmission defined in claim 20, wherein said first input clutch is applied for even number speed ranges and said second input clutch is applied for odd number speed ranges.

30. The transmission defined in claim 20, wherein selected ones of said seven torque-transmitting mechanisms are engaged prior to gear shifting to achieve shifting without torque interruptions.

* * * * *